United States Patent
Fan et al.

(10) Patent No.: US 11,612,860 B2
(45) Date of Patent: Mar. 28, 2023

(54) OSMOTIC FLUID PURIFICATION AND DRAW COMPOUNDS THEREOF

(71) Applicant: TREVI SYSTEMS INC., Rohnert Park, CA (US)

(72) Inventors: Shaobin Fan, Petaluma, CA (US); Gary Carmignani, Petaluma, CA (US); John Webley, Petaluma, CA (US)

(73) Assignee: TREVI SYSTEMS INC., Rohnert Park, CA (US)

( * ) Notice: Subject to any disclaimer, the term of this patent is extended or adjusted under 35 U.S.C. 154(b) by 452 days.

(21) Appl. No.: 16/327,037

(22) PCT Filed: Oct. 19, 2017

(86) PCT No.: PCT/US2017/057395
§ 371 (c)(1),
(2) Date: Feb. 21, 2019

(87) PCT Pub. No.: WO2018/045393
PCT Pub. Date: Mar. 8, 2018

(65) Prior Publication Data
US 2019/0224623 A1 Jul. 25, 2019

Related U.S. Application Data

(60) Provisional application No. 62/494,841, filed on Aug. 22, 2016.

(51) Int. Cl.
*B01D 61/00* (2006.01)
*B01D 61/58* (2006.01)
(Continued)

(52) U.S. Cl.
CPC .......... *B01D 61/005* (2013.01); *B01D 61/58* (2013.01); *C08G 59/02* (2013.01); *C08G 65/08* (2013.01);
(Continued)

(58) Field of Classification Search
None
See application file for complete search history.

(56) References Cited

U.S. PATENT DOCUMENTS 3,337,463 A * 8/1967 Schmolka ............ C11D 3/0094
510/423
8,021,553 B2 9/2011 Iyer
(Continued)

FOREIGN PATENT DOCUMENTS

| WO | 2015156404 A1 | 10/2015 | |
|----|----|----|----|
| WO | WO-2015156404 A1 * | 10/2015 | ............ B01J 20/264 |
| WO | 2018045393 A2 | 3/2018 | |

OTHER PUBLICATIONS

International Search Report and Written Opinion; PCT Application PCT/US2017/057395; dated Apr. 13, 2018.
(Continued)

*Primary Examiner* — Clare M Perrin
(74) *Attorney, Agent, or Firm* — Polsinelli PC

(57) ABSTRACT

Draw compounds and draw solutions comprising said draw compounds for use in forward osmosis solvent purification systems. The draw compound may be a linear random, sequential, or block molecular chain consisting of at least one oxide monomer or diol monomer and have a temperature-dependent affinity with a feed solvent. The draw compound may further include a first terminal group and a second terminal group, at least one of the first terminal group and the second terminal group selected from the group consisting of a hydroxyl group, an amine group, a carboxylic group, an allyl group, and a C1 to C14 substituted and unsubstituted alky group. The draw compound may also be a branched random, sequential, or block molecular chain consisting of at least one oxide monomer or diol monomer.

11 Claims, 5 Drawing Sheets

(51) Int. Cl.
 *C08G 59/02* (2006.01)
 *C08G 65/08* (2006.01)
 *C08G 65/26* (2006.01)
 C09K 8/60 (2006.01)
 C08L 71/02 (2006.01)

(52) U.S. Cl.
 CPC ...... *C08G 65/2609* (2013.01); *B01D 2311/06* (2013.01); *B01D 2311/2642* (2013.01); *B01D 2313/221* (2022.08); *C08L 71/02* (2013.01); *C09K 8/60* (2013.01)

(56) References Cited

U.S. PATENT DOCUMENTS

| | | |
|---|---|---|
| 2012/0211423 A1 | 8/2012 | Kim et al. |
| 2012/0267308 A1* | 10/2012 | Carmignani ......... B01D 21/267 210/644 |
| 2016/0039685 A1 | 2/2016 | Carmignani et al. |
| 2016/0046360 A1* | 2/2016 | Kim .................... B01D 61/005 210/348 |
| 2016/0082391 A1 | 3/2016 | Hu et al. |
| 2017/0182477 A1* | 6/2017 | Fuchigami ......... C08G 65/2609 |
| 2017/0259210 A1 | 9/2017 | Kanemaru et al. |

OTHER PUBLICATIONS

International Preliminary Report on Patentability for International Application No. PCT/US2017/057395, dated Mar. 7, 2019, 13 pages.

\* cited by examiner

OSMOTIC FLUID PURIFICATION AND DRAW COMPOUNDS THEREOF

CROSS-REFERENCE TO RELATED APPLICATIONS

This application is a national stage entry of PCT/US2017/057395 filed Oct. 19, 2017, which claims priority to U.S. Provisional application No. 62/494,841, filed on Aug. 22, 2016, each of the aforementioned applications are expressly incorporated herein in their entirety.

FIELD OF TECHNOLOGY

The present disclosure is directed to the purification, decontamination, or desalination of sea water, brackish water, waste water, industrial water, produced water and/or contaminated water using thermal sensitive draw compounds for osmotic fluid purification. The present disclosure is further directed to draw compounds for forward osmosis for inorganic, organic, ionic, and/or polymeric fluids or solutions in which the solute is separated, concentrated, or recovered from the solvent by an osmotic process.

BACKGROUND

Fluid purification and treatment is widely used in industrial applications. Fluids suitable for fluid purification may include solutions having both dissolved solids (solutes) and liquid components (solvents), and sometimes containing suspended solid particles. A fluid may be an inorganic, organic, ionic, and/or polymeric solution, or a mixture of the above. Often the solute in a fluid is sought after for its industrial and consumer value, but in many cases the solvent is the product of use. With industry and society becoming more and more conscious of conservation and environmental issues, the separation, concentration, and recovery of both solute and solvent in a cost and energy efficient way is an important field.

One effective fluid purification and treatment process is an osmotic process wherein the separation, concentration, and recovery of the solute and/or solvent are carried out by osmotic processes. Osmotic processes for fluid purification may include forward osmosis process. In a forward osmosis process, the solvent is transported through a semipermeable membrane from the feed side to the draw side of the membrane. A draw solution having an osmotic pressure greater than that of the feed solution is provided to the draw side of the membrane. The forward osmosis process involves a natural phenomenon and requires no energy consumption. The transport of the solvent from the low osmotic pressure feed side of the membrane to the high osmotic pressure draw side of the membrane continues until equilibrium in osmotic pressure is reached. Forward osmosis process has drawn interest due to the likelihood of future water shortage and a corresponding increase in demand for cost effective fluid purification technologies. Sea water, brackish water or otherwise contaminated water may be purified by causing water (solvent) to be transported through a semipermeable membrane that rejects the dissolved salts and other contaminates (the solutes) by using the osmotic pressure of the draw solution to pull the solvent through the membrane.

In at least some instances, an ideal draw solute is characterized by high flux, low reverse solute diffusion, and easy regeneration. Furthermore, an ideal draw solute should be, at least in some instances, stable at standard operating temperature and pressure, chemically inert, biologically safe and environmentally friendly. In at least some instances, an ideal draw solute may be a thermally sensitive oligomer or polymer which can use waste heat to separate the oligomer or polymer from the solvent component while the draw solution can be reused. The draw solution may also be a natural compound, a "green material," and/or a compound produced by green chemistry for health and safety considerations intrinsic to water purification applications.

U.S. Pat. No. 5,679,524 to Chakrabarti described using temperature dependent solubility of polymers in water to accomplish desalination in a liquid/liquid separation process. In the disclosed process, a nonionic surfactant is mixed with sea water in an attempt to separate salt from water in a direct osmosis process. However, the salt partition and product water yield may be undesirably low in at least some instances.

U.S. Pat. No. 8,021,553 to Iyer describes a system using a retrograde soluble polymer solute and a nanofilter for separation and recovery of the resulting solute micelles from the product water. Iyer specifies draw solutes with both a hydrophobic and hydrophilic component. Iyer also discloses a semi-batch recovery of the solutes by collecting the precipitated (or phase separated) draw solute on a nanofilter and recovering the solute by back flushing the nanofilter. Such approaches may be impractical due to the high solids loading on the membrane and the resulting low flux achieved in the nano filtration step.

U.S. Patent Application Publication No. 2012/0180919 to Kim et al. discloses a draw solute for forward osmosis comprising a temperature-sensitive oligomer compound. The temperature-sensitive oligomer compound may comprise a structure unit derived from a monomer selected from N-isopropylamide (NIPAM), N,N-diethylacrylamide (DEAAM), N-vinylcaprolactam (VCL), and a combination thereof.

U.S. Patent Application Publication No. 2013/0240444 to Jung et al. discloses a thermosensitive copolymer comprising a first repeating unit having a temperature-sensitive oligomer and a second repeating unit having an ionic moiety and a counter ion to the ionic moiety. While the copolymerization of a second repeating unit having an ionic moiety improves osmotic pressure, the copolymer disclosed may not possess a sufficiently high osmotic pressure and high water flux for water treatment such as for sea water desalination.

U.S. Patent Application Publication No. 2014/0217026 to Han et al. discloses a method of manufacturing a polymer hydrogel for an osmosis solute consisting of cross-linking and polymerizing a zwitterionic monomer and a temperature-sensitive monomer. While a polymer hydrogel such as the one disclosed is expected to reduce reverse diffusion of the draw solute, the water flux from such a polymer hydrogel draw solute is low and the long term stability of the hydrogel is a serious problem limiting its practical applications.

U.S. Patent Application Publication No. 2015/0060361 to Jung et al. discloses a draw solute including an amino acid repeating unit with an ionic moiety and a counter ion thereof. The disclosed draw solution has the advantage of being environmentally friendly and of a relatively low level of toxicity. However, stability of the draw solute at elevated temperatures, water flux and reverse solute diffusion through the semipermeable membrane need to be improved.

U.S. Pat. No. 9,216,917 to Carmignani, Sitkiewitz, and Webley describes systems and processes for forward osmosis water purification or desalination, wherein the diluted draw solution stream is heated, agglomerated and cooled to produce a cooled single phase water rich stream that is then further purified to produce a water product stream.

WO 2015/156404 to Fuchigami et. al. describes a temperature-sensitive absorbent having a cloud point, and being designed to agglomerate when heated. This temperature-sensitive absorbent includes at least a hydrophobic portion and a hydrophilic portion, and is a block copolymer that has a glycerol skeleton as the basic skeleton thereof, and that includes an ethylene oxide group and a group comprising propylene oxide and/or butylene oxide. Alternatively, the temperature-sensitive absorbent is a block copolymer that has a trimethyolpropane skeleton as the basic skeleton thereof, and that includes ethylene oxide and butylene oxide.

WO 2016/027865 describes a solvent separation system and method using a three step process and a thermal-phase-change-type of polymer. The thermal-phase-change-type of polymers are linear polymers with a molecular weight from 300 to 10,000. More specifically, the thermal-phase-change-type of polymer is a copolymer of ethylene oxide and propylene oxide with one or more of the terminal hydroxyl groups, alkyl groups, a phenyl group, an allyl group.

There is a need for improved fluid purification and treatment systems and processes, and in particular, for improved draw compounds and solutions that may be used in forward osmosis system and process. Desirable properties of an improved draw compound may include exhibiting high flux, low reverse solute diffusion, easy regeneration, physical and chemical stability, and being safe and environmentally friendly.

BRIEF DESCRIPTION OF THE DRAWINGS

Embodiments of the present application are described, by way of example only, with reference to the attached Figures, wherein.

Figure 1:
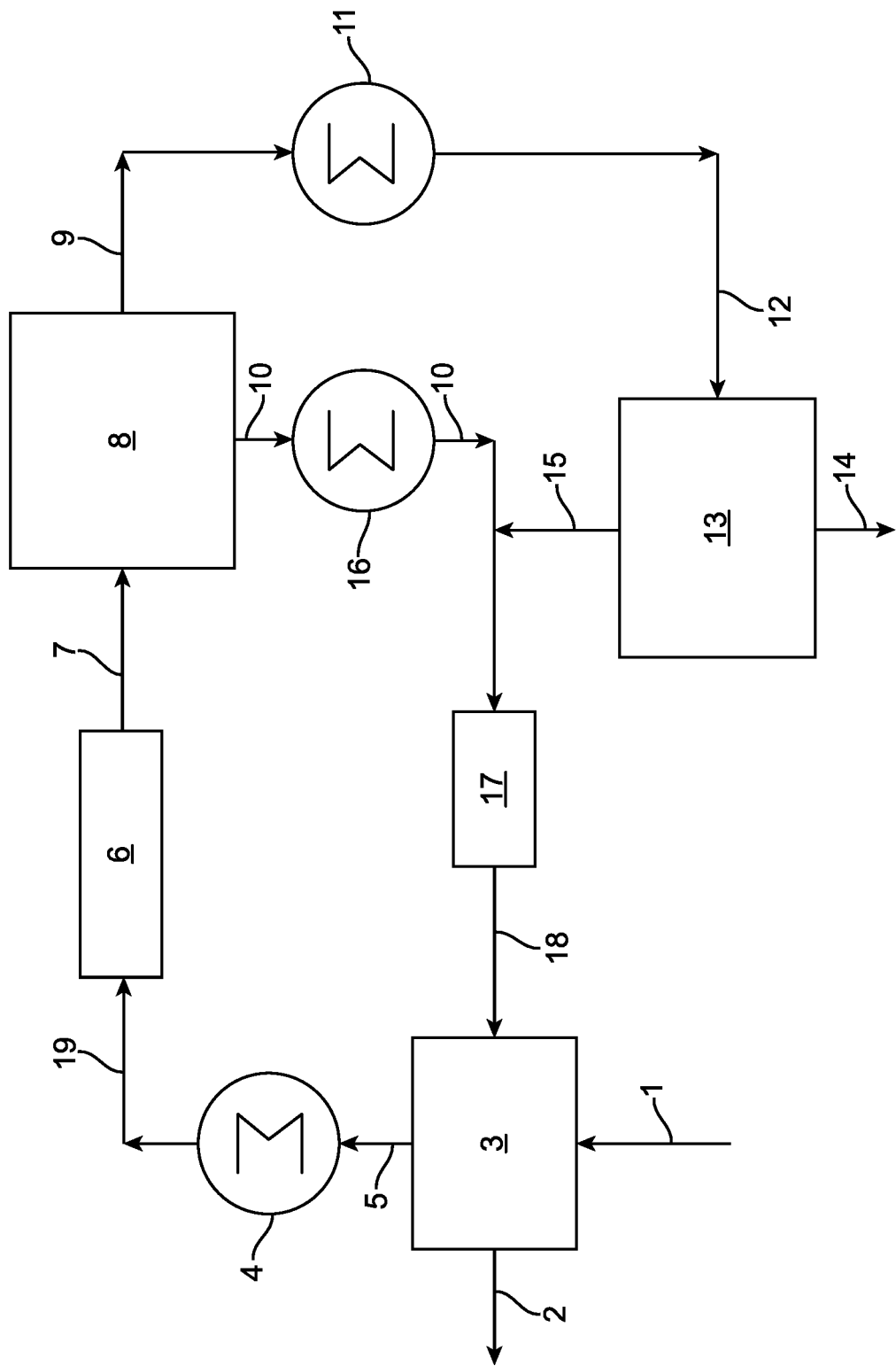
FIG. 1 is an illustration depicting an exemplary forward osmosis system, device, and process, according to an example embodiment of the present disclosure.

It should be understood that the various aspects are not limited to the arrangements and instrumentality shown in the drawings.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented. The term "coupled" is defined as connected, whether directly or indirectly through intervening components, and is not necessarily limited to physical connections. The term "fluidically coupled" is defined as connected, either directly or indirectly through intervening components, and the connections are not necessarily limited to physical connections, but are connections that accommodate the transfer of solutions, dispersions, mixtures, or other fluids between the so-described components. The connections can be such that the objects are permanently connected or reversibly connected. The terms "comprising," "including" and "having" are used interchangeably in this disclosure. The terms "comprising," "including" and "having" mean to include, but are not necessarily limited to, the things so described.

As used herein, the terms "purify," "purified," or "purification," in their various forms, refer to one or more processes that produce solvent, such as water, having at least an incremental increase in purity and/or an incremental decrease in solute concentration or contaminant concentration. As such, the terms "purify," "purified," or "purification," do not necessarily refer to the production of solvent having a particular purity or a particular solute concentration, rather, the terms are used to refer to the production of solvent having at least an incremental increase in purity and/or an incremental decrease in solute concentration or contaminant concentration, resulting from the presently disclosed methods and techniques.

As used herein, the term "stream," in its various forms, including its use in the term "feed stream," refers to a solution that may be flowed to or received in a portion or component of an apparatus or system of the present disclosure, and is not limited to solutions introduced into an apparatus or system, or portion thereof, under continuous flow, but rather, may also include solutions received in an apparatus or system for a period of time, such as that which may be employed in a series of batch processes.

The present disclosure provides improved osmotic fluid purification systems and processes having draw compounds. According to at least one aspect of the present disclosure, a draw compound with a linear structure and/or a branched structure for forward osmosis is provided. The presently disclosed process may include providing a semipermeable membrane and a feed solution comprising solvent and having a first osmotic pressure on a feed side of the semipermeable membrane and providing a draw solution comprising a draw solute and having a second osmotic pressure on a draw side of the semipermeable membrane. Solvent may be transported from the feed side and through the semipermeable membrane to produce a dilute draw solution on the draw side of the semipermeable membrane. The diluted draw solution may be heated sufficiently to initiate phase separation and produce a two phase effluent stream comprising a liquid phase of draw solute solution, containing the draw compound, and a liquid phase of water. The draw compound is permitted to agglomerate in the diluted draw solution to produce an agglomerated two-phase effluent stream comprising a liquid phase of agglomerated draw solute and a liquid phase of water. The agglomerated draw solute is separated from the diluted draw solution to produce a solvent rich stream, comprising residual draw solute and solvent, and a solute rich stream, comprising agglomerated draw solute and solvent. The solvent rich stream is cooled to produce a cooled single phase solvent rich stream comprising the residual draw solute. The residual draw solute is separated from the cooled single phase solvent rich stream to produce a residual draw solute stream and a purified solvent product stream. By way of a non-limiting example, the solvent may be water and the presently disclosed forward osmosis water treatment system and process may be implemented to treat sea water, brackish water, industrial and municipal waste water, contaminated water, and the like.

The presently disclosed systems and processes for forward osmosis water purification or desalination initiate phase separation by heating. The resulting dispersed two phase system is aggregated using a coalescer and the bulk of the solute is recovered using a phase separator. Finally, the resulting water rich stream is cooled to dissolve any remaining dispersed solute and a single phase stream, or low solute concentration, is sent to a filter (e.g., nanofilter) for final, continuous, filtration processing. The nanofilter is selected to reject the solute molecular based on size or structure and ideally passes most of the dissolved salt. A solute free water filter permeate is the process product. According to at least one aspect of the present disclosure, the presently disclosed systems and processes for forward osmosis water purification or desalination, may include those features and elements of the systems and devices disclosed in U.S. Pat. No. 9,216,917, which is herein incorporated by reference, in its entirety.

FIG. 1 illustrates a forward osmosis process, device, and system that may be used with the presently disclosed draw compounds and draw solutions, according to an exemplary embodiment of the present disclosure. A brackish water source stream 1 is fed to a feed side of a semipermeable membrane in a forward osmosis module 3. A draw solution stream 18 is fed to a draw side of a semipermeable membrane in the forward osmosis module 3. The osmotic pressure of brackish water source stream 1 is less than the osmotic pressure of the draw solution stream 18. This pressure differential drives water from the brackish water source stream 1 to permeate through the semipermeable membrane resulting in a dilute draw solution stream 5 and a brine stream 2.

The dilute draw solution stream 5 is passed through a heat exchanger network 4 where the temperature is increased sufficiently to initiate phase separation and supersaturate the dilute draw solution stream 5 with solute. The heat exchanger network 4 can include one or more heat exchangers configured in series or parallel for increasing the temperature of the dilute draw solution 5. The temperature of the dilute draw solution stream 19 exiting as effluent from the heat exchanger network 4 is sufficient to create a two phase effluent.

The two phase draw solution effluent stream 19 exiting the heat exchanger network 4 is fed to a temperature controlled coalescer 6 to agglomerate small solute rich droplets in the heat exchanger network 4. The coalescer 6 is designed to aggregate solute rich drops large enough to be separated in the subsequent phase separator process 8. In an exemplary embodiment, the coalescer 6 is designed to aggregate solute rich drops to greater than 10 µm, preferably greater than 25 µm and more preferably greater than 50 µm. The pressure drop caused by two phase flow streams passed through the coalescer 6 is significantly less than pressure drop caused by two phase flow streams passed through a nanofilter. The use of the coalescer 6 eliminates added complexity and back-flushing required in semi-batch operations.

The coalescer 6 can also be segregated into a top section comprising hydrophobic coalescing elements for agglomerating the draw solute and a bottom section comprising hydrophilic coalescing elements for water aggregation. The degree of hydrophobicity of the hydrophobic coalescing elements and the degree of hydrophilicity of the hydrophilic coalescing elements are selected to achieve a specific degree of agglomeration of the draw solute to greater than 10 µm. In an exemplary embodiment, the degree of hydrophobicity of the hydrophobic coalescing elements and the degree of hydrophilicity of the hydrophilic coalescing elements are selected to agglomerate the draw solute to greater than 10 µm.

The coalescer effluent stream 7 is fed to a liquid phase separator 8 wherein the solute rich drops from the coalescer 6 are accumulated. The liquid phase separator 8 is designed to separate two or more immiscible liquids or solutions. More particularly, the liquid phase separator 8 is designed to separate solute from water and produce a continuous solute rich stream 10 and a continuous water rich stream 9. The liquid phase separator 8 can be a temperature controlled gravity phase separator, centrifuge, hydro-cyclone or similar device. In at one embodiment of the present disclosure, the liquid phase separator 8 is a temperature controlled gravity phase separator. In an exemplary embodiment, the operating temperature of the coalescer 6 and liquid phase separator 8 is maintained at less than 150° C. In other instances, the operating temperature of the coalescer 6 and liquid phase separator 8 may be maintained at less than 100° C. and or less than 80° C. to establish a specific concentration of the solute and osmotic pressure of the water rich stream 9 exiting as effluent from the liquid phase separator 8. In an exemplary embodiment, the operating temperature of the coalescer 6 and liquid phase separator 8 is selected to establish a concentration of solute in the water rich stream 9 of less than 5%, or less than 2% or less than 1% by weight solute in solution.

In an exemplary embodiment, the liquid phase separator 8 is designed to concentrate the solute in the solute rich stream 10 to a concentration of greater than 60%, or greater than 80% or greater than 90% by weight solute in solution. The solute rich stream 10 exiting the liquid phase separator 8 as effluent is cooled in a heat exchanger 16. The water rich stream 9 exiting as effluent from the phase separator 8 is also cooled by a heat exchanger 11 to allow residual solute to redissolve and to create a single phase cooled water rich stream 12. The cooled water rich stream 12 is a single phase stream fed to a nanofilter 13, ultrafilter, or reverse osmosis module including a semipermeable membrane or similar device used to separate the residual solute from the product water. The nanofilter 13 is selected to reject the solute molecules based on size or structure and ideally passes most of the dissolved salt. The final filtration step in the nanofilter 13, ultrafilter, reverse osmosis module or similar device is used only for the recovery of the residual solutes in the single phase cooled water rich stream 12. The solutes are redissolved in single phase cooled water rich stream 12 to minimize pressure drop across the nanofilter 13 and to simplify operation. A solute free water filter permeate 14 is the process product.

The solute rich stream 15 exiting the nanofilter 13 is combined in a mixer 17 with the cooled solute rich stream 10 exiting the heat exchanger 16 to create a combined solute rich stream 18 (that is, the draw solution stream 18, above). The mixer 17 is used to completely dissolve the solute in the resulting combined solute rich stream 18. The combined solute rich stream 18 is fed to the forward osmosis module 3 to purify or desalinate the source stream 1 in a continuous manner. The solute rich stream 10 exiting the phase separator 8 as effluent is cooled in the heat exchanger 16 to a specific temperature that maintains the temperature of combined solute rich stream 18 sufficiently low and provides complete solubility of the solute in the combined solute rich stream 18 entering the forward osmosis module 3.

In an exemplary embodiment of FIG. 1, the coalescer 6 and/or the phase separator 8 can be heated to operating temperature with an additional external heat source (not shown).

In another exemplary embodiment of FIG. 1, the coalescer 6 and phase separator 8 are combined into one physical device. Alternatively, the surface area within the heat exchanger network 4 and the piping between the heat exchanger network 4 and the phase separator 8 can be used in place of the coalescer 6.

The draw compound may be an inorganic, organic, ionic, polymeric compound, or any combination thereof. More specifically, the draw compound may be a temperature-sensitive inorganic, organic, ionic, polymeric compound, or any combination thereof. In at least some instances, the suitable draw solute may be a temperature sensitive organic, oligomeric, polymeric compound which separates into a feed solvent rich layer and a draw compound rich layer upon being heated above the phase transition temperature of the diluted draw solution. Depending on the density differentiation of the feed solvent rich layer and the draw compound rich layer, the feed solvent rich layer may float on top or sink to the bottom of the containment vessel for easy separation. The phase separation process concentrates the diluted draw compound solution, thereby drastically increasing its osmotic pressure so the concentrated draw solution may draw the feed solvent through a semipermeable membrane in a forward osmosis process.

According to at least one aspect of the present disclosure, the draw solute may be a temperature-sensitive oligomer or polymer. In such cases, the temperature-sensitive polymer may be a linear, sequential, block, branching, graft, gradient, star, dendritic oligomer or copolymer, or any combination thereof. In at least some instances, the temperature-sensitive polymer may be a homopolymer, a linear random or block copolymer, a branched random or block copolymer, or any combination thereof. The composition, structure, and architecture of the temperature-sensitive polymer may be designed to optimize its osmotic pressure and flux, and minimize reverse diffusion, as well as the residual amount of the draw compound in the separated feed solvent stream. Preferably, the starting compound and repeating unit of the temperature-sensitive draw solute may be selected from green compounds and natural compounds to ensure that the draw solute is not toxic to human, animal, and marine life.

According to at least one aspect of the present disclosure, the temperature-sensitive draw compound may be a linear random and/or block polyethylene oxide-polypropylene oxide oligomer or polymer. In at least some instances, the temperature-sensitive polymer may be a linear random and/or block polyethylene oxide-polypropylene oxide-polybutylene oxide copolymer. The composition and monomer ratio may be selected to optimize osmotic pressure and flux while minimizing reverse diffusion as well as the residual amount of the draw compound in the separated feed solvent stream. The terminal group of the draw compound may be capped with methyl, ethyl, propyl, butyl, phenyl, and other aryl groups.

According to at least one aspect of the present disclosure, the temperature-sensitive draw compound may be a branched random and/or block polyethylene oxide-propylene oxide oligomer or polymer. In at least some instances, the temperature-sensitive draw compound may be a branched random and/or block polyethylene oxide-propylene oxide-butylene oxide oligomer or copolymer. The branching structure and architecture has shown significant improvement in reducing reverse solute diffusion through the front forward osmosis membrane and through the back nano filtration and reverse osmosis (RO) membranes in comparison to the linear polymer. Similarly, the terminal group of the branching polymer may be capped with methyl, ethyl, propyl, butyl, phenyl, and other aryl groups.

According to at least one aspect of the present disclosure, the draw solution comprising the temperature-sensitive compound exhibits an osmotic pressure higher than that of the feed fluid, which enables the transfer of the solvent from the feed fluid through a semipermeable membrane or re-partitioning of the solvent in the mixture of draw solution and feed solution. The affinity between the temperature-sensitive draw compound and the solvent weakens as the solution comprising the draw compound and the solvent is heated or cooled, resulting in phase separation or precipitation, thus providing a way for effective fluid purification and treatment.

The presently disclosed draw solution and temperature-sensitive draw compound may be used in the production of fresh water and waste water treatment by the forward osmosis process by using the temperature-sensitive draw compound to aggregate the heated or cooled aqueous solution. The temperature-sensitive draw compound may have a cloud point that facilitates phase separates into a solute-rich phase and a solvent-rich phase. In at least some instances, devices for water purification and/or waste water treatment may include the presently disclosed draw solution and temperature-sensitive draw compound.

In at least some instances, the temperature-sensitive draw compound may be a linear random, sequential, and/or block oligomer or polymer which may be represented by the follow general formula $$R_1\text{-}A\text{-}R_2 \qquad \text{(Formula 1-1)}$$

wherein A is an oligomer or polymer segment with statistically random, sequential, and/or block structure, $R_1$ and $R_2$ are terminal groups of hydrogen, hydroxyl, carboxylic, amine, allyl, phenyl, and a substituted or unsubstituted C1 to C14 alkyl groups.

The structure element A may be an oligomer, homopolymer, and copolymer of epoxides and cyclic ethers comprising ethylene oxide, propylene oxide, 1,2-epoxy-butane, 2,3-epoxy-butane, styrene oxide, epiflurohydrin, epichlorohydrin, tetrahydrofuran, oxetane, dioxolane, trioxane, butyl glycidyl ether, phenyl glycidyl ether, allyl glycidyl ether, and the like. Similarly, the structure element A may also be an oligomer, homopolymer, and copolymer of diols comprising 1,2-ethanediol, 1,2-propanediol, 1,3-propanediol, 1,4-butanediol, 1,5-pentanediol, substituted diols such as 2-methyl-2-propyl-1,3-propanediol and neopentyl glycol, aromatic diols such as resorcinol and 4,4'-(propane-2,2-diyl)diphenol, and the like.

In at least some instances, the structure element A may comprise ethylene oxide and propylene oxide, and the temperature-sensitive draw compound may be represented by the formula

(Formula 1-2)

wherein the terminal groups $R_1$ and $R_2$ are hydroxyl groups, the formula becomes

(Formula 1-3)

In at least some instances, the temperature-sensitive draw compound may be a linear random, sequential, and/or block copolymer of ethylene oxide, propylene oxide, and butylene oxide, and may be represented by the following formula

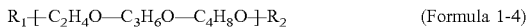
(Formula 1-4)

wherein $R_1$ and $R_2$ are terminal groups selected from the group consisting of hydrogen, hydroxyl, carboxylic, amine, allyl, phenyl, and a substituted or unsubstituted C1 to C14 alkyl groups.

In at least some instances, the temperature-sensitive draw compound may be a branched random, sequential, and/or block copolymer which may be represented by the general formula

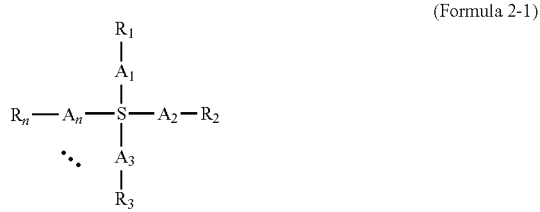
(Formula 2-1)

wherein S is a starting compound which reacts with monomers such as ethylene oxide, propylene oxide, butylene oxide, and the like; $A_1, A_2, A_3,$ and $A_n$ are the branching elements and each may be a random, sequential, and/or block structure itself; $R_1, R_2, R_3,$ and $R_n$ are terminal groups of hydrogen atom, hydroxyl, carboxylic, amine, allyl, phenyl, and a substituted or unsubstituted C1 to C14 alkyl groups.

Suitable starting compound S for the preparation of branched temperature-sensitive draw compounds has 3 or more functionality in their molecular structure, which may include, but is not limited to, polyols, polyamines, polycarboxylic acids, and the like. The starting compound itself may have a linear or ring structure, may be hydrophobic or hydrophilic, and may be flexible or rigid to optimize flux and minimize reverse solute diffusion. In some instances, the starting compounds may be polyols, such as glycerol, trimethylolpropane, pentaerythritol, diglycerol, ditrimethylolpropane, phloroglucinol, sorbitol, sorbitan, glucose, fructose, and methyl glucoside. For portable water, sea water desalination, and environmental friendly fluid treatment systems, the preferred starting compound is a green substance or natural compound, and more preferably is a food grade compound which includes, but is not limited to, vitamins such as ascorbic acid and sugar alcohols. Suitable sugar alcohols may include, but is not limited to, glycerol for the preparation of 3-arm branched draw compound; erythritol and threitol for the preparation of 4-arm branched draw compound; arabitol, ribitol, and xylitol for the preparation of 5-arm branched draw compound; fuctitol, galacititol, iditol, inositol, mannitol, and sorbitol for the preparation of 6-arm branched draw compound; and volemitol, isomalt, maltitol, lactitol for the preparation of 7-arm and more branched draw compound.

The structure elements $A_1, A_2, A_3,$ and $A_n$ in Formula 2-1 may be selected from the group consisting of oligomer, homopolymer, and copolymer of epoxides and cyclic ethers comprising ethylene oxide, propylene oxide, 1,2-epoxybutane, 2,3-epoxy-butane, styrene oxide, epiflurohydrin, epichlorohydrin, tetrahydrofuran, oextane, dioxolane, trioxane, butyl glycidyl ether, phenyl glycidyl ether, ally glycidyl ether, and the like. Similarly, the structure element $A_1, A_2, A_3,$ and $A_n$ in Formula 2-1 may also be an oligomer, homopolymer, and copolymer of diols comprising 1,2-ethanediol, 1,2-propanediol, 1,3-propanediol, 1,4-butanediol, 1,5-pentanediol, substituted diols such as 2-methyl-2-propyl-1,3-propanediol and neopentyl glycol, aromatic diols such as resorcinol and 4,4'-(propane-2,2-diyl)diphenol, and the like. Each of the structure elements may have the same or different composition, molecular weight, chain length, and molecular architecture.

The simplest branched temperature-sensitive draw compound is a 3-arm oligomer or polymer. The following Chemical Formula 2-2 and Chemical Formula 2-3 illustrate the 3-arm branched oligomer and polymer with glycerol and trimethylolpropane as the starting compound.

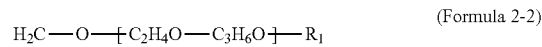
(Formula 2-2)

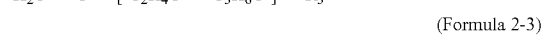
(Formula 2-3)

Additionally, the branched temperature-sensitive draw compound may be a 4-arm oligomer or polymer. For example, in at least some instances, the starting compound may be penterythritol and the corresponding 4-arm temperature-sensitive polymer has a structure illustrated in the following formula

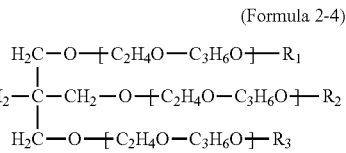
(Formula 2-4)

Furthermore, a branched temperature-sensitive draw compound with 6-arm structure may be synthesized. In addition to a higher number of arms, the starting compound may have additional advantage to be a green substance and/or natural compound and may be selected from readily available natural sugar alcohols such as sorbitol. Such an exemplary 6-arm temperature-sensitive oligomer or polymer may be represented by the formula below.

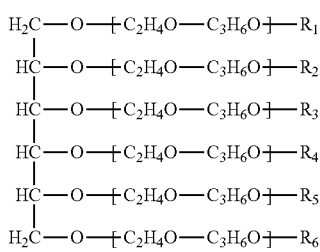

(Formula 2-5)

The presently disclosed oligomer or polymer draw compound may be synthesized in a laboratory and/or industrial batch reactor. In at least some instances, a linear/branched random or sequential ethylene oxide-propylene oxide oligomer or polymer may be prepared by feeding pressurized ethylene oxide and propylene oxide into a stainless steel reactor. A strong base such as sodium hydroxide may be used as a catalyst to induce the ring opening polymerization and the reaction temperature may be maintained between 120-175° C. Upon completion of the reaction, the resulting oligomer or polymer may be cooled down, neutralized, and filtered to remove impurities. Alternatively, a linear/branched block ethylene oxide-propylene oxide oligomer or polymer may be prepared by feeding the first reactant, which may be either ethylene oxide or propylene oxide, into a batch reactor. Upon the completion of the ring opening reaction of the first reactant, a second reactant may then be injected into the reactor to continue the chain growth process. The resulting ethylene oxide-propylene oxide block copolymer may then be cooled, neutralized, and filtered to remove impurities.

The presently disclosed draw compounds may consist of various numbers and orders of monomers, which impact the required solution properties. Osmotic pressure, cloud point temperature, molecular weight, molecular structure and architecture of the presently disclosed draw compounds may be adjusted by adding or subtracting the various monomer units and/or chemical elements.

The branched temperature-sensitive draw polymer should have 3 or more branches, or 3 or more arms, which allows it to be trapped and retained effectively by the open pores of a semipermeable forward osmosis membrane, reverse osmosis membrane, and nanofiltration membrane, resulting in low reverse solute diffusion. Depending on the length and structure of the arms, the branched polymer may exhibit low viscosity in comparison to a linear polymer with an equivalent molecular weight, further enhancing molecular diffusivity and increasing flux.

The presently disclosed draw solutes may be temperature-sensitive in nature. Upon exposure to a temperature change, such as heating or cooling, the solution may undergo phase separation to form a solute-rich phase and a solvent-rich phase. The draw solution may have an upper critical solution temperature (UCST) or a lower critical solution temperature (LCST) type phase diagram, depending on the application intended. In an UCST phase diagram, the solution has an upper critical solution temperature and the initially homogeneous solution phase separates below the phase separation temperatures. On the other hand, a solution exhibiting LCST phase behavior has a lower critical solution temperature and the initial homogeneous solution phase separates at a temperature above the phase separation temperatures. In a binary system, an LCST solution first separates into small domains of a solute-rich phase and a solvent-rich phase at a temperature slightly above the critical temperature. When the temperature is further raised and/or phase separation time is further prolonged, the small domains coalesce together to form large domains in micro- to millimeter size. Depending on the density difference, the heavy phase sinks to the bottom while the light phase floats to the top, thus forms two distinct layers. It should be appreciated that this solute and solvent separation process is both a thermodynamic phenomenon and a kinetic process. The optimal design of thermal phase separation fluid treatment process cannot be achieved without a thorough understanding of the relationship between thermodynamics and dynamics.

Since a solute-rich phase and a solvent-rich phase typically exhibit different refractive indexes, the onset of the phase separation in a binary system may be detected by the appearance of cloudiness due to the scattering of light by the domains with characteristic dimension in the range of visible light wavelength. The temperature at which a solution turns cloudy is defined as the cloud point for a temperature-sensitive compound.

In at least some instances, the temperature-sensitive compound has a LCST type phase diagram. Depending on its cloud point and phase separation temperatures, the diluted draw compound solution exiting a semipermeable membrane may phase separate into a solute-rich phase and a solvent-rich phase at or below room temperature. While a low cloud point draw solution saves electric and thermal energy consumption, such a draw compound and solution may not have a high osmotic pressure necessary for an osmotic fluid treatment system, in particular in forward osmosis processes. The cloud point of a draw solution thus needs to be selected carefully, and a draw compound has to be designed to have an appropriate cloud point to optimize performance in an osmotic fluid process.

The suitable cloud point of a draw compound is dependent on the intended application. For potable water production and sea water desalination, the cloud point or phase separation temperature of the draw solution may be in the range of from about 20° C. to about 100° C. In at least some instances, the cloud point or phase separation temperature of the draw compound may be in the range of from about 35° C. to about 80° C. In other cases, the cloud point or phase separation temperature of the draw compound may be in the range of from about 45° C. to about 70° C. On the other hand, for zero-liquid discharge (ZLD), the cloud point or phase separation temperature may be selected from about 50° C. to about 175° C. In other such cases, the cloud point or phase separation temperature may be selected from about 75° C. to about 150° C. In still other cases, the cloud point or phase separation temperature may be selected from about 90° C. to about 125° C. for zero-liquid discharge (ZLD) process and high salinity water treatment in oil-and-gas industry.

Figure 2:
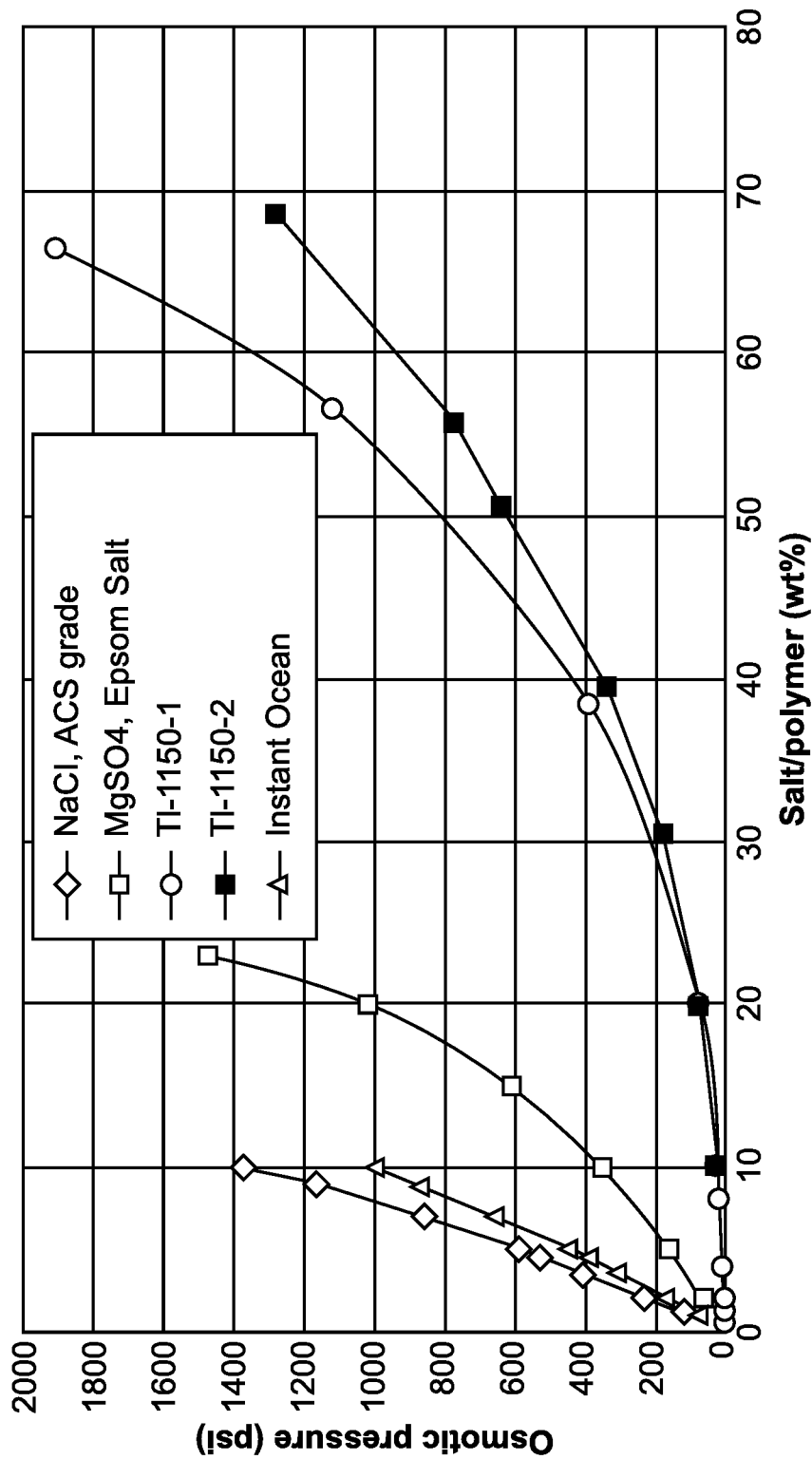
FIG. 2 is an illustration depicting osmotic pressure measurements for exemplary salt and polymer solutions as well as simulated sea water (Instant Ocean), according to an example embodiment of the present disclosure.

The presently disclosed draw compounds may have a useful working osmotic pressure at ambient conditions and at elevated temperatures. In at least some cases, the presently disclosed draw compounds have a high osmotic pressure. Referring to FIG. 2, the osmotic pressure of simulated sea water (Instant Ocean) is approximately 320 psi with a 3.5% TDS (Total dissolved solids) content. However, the TDS can be as high as 4.5% for sea water in the Middle East region and the corresponding osmotic pressure is approximately 400 psi. Generally speaking, a high water flux is directly related to a high osmotic pressure of the draw solution. Therefore, in such cases, draw solutions comprising the draw compound preferably exhibit a high osmotic pressure across the working range of concentrations. For example, in sea water desalination, the osmotic pressure of the draw solution should be from about 400 psi to greater than 1200 psi in the regenerated concentrated state. In some cases, the osmotic pressure of the draw solution may be at least 400 psi in the regenerated concentrated state. In other instances, the osmotic pressure of the draw solution may be at least 700 psi in the regenerated concentrated state. In yet other instances, the osmotic pressure of the draw solution may be at least 1200 psi at the regenerated concentrated state. As used herein, the term "regenerated concentrated state" refers to the high concentration of the draw compound after thermally induced phase separation. The term "regenerated concentrated state" may also refer to the high solute concentration of the draw compound in the draw solution before the draw solution is fed into the semipermeable membrane in forward osmosis process. For high salinity water treatment and ZLD process, the osmotic pressure of the draw solution may be from about 1200 psi to about 3500 psi in the regenerated concentrated state. In other instances, the osmotic pressure of the draw solution may be at least 1200 psi at the regenerated concentrated state, in the case of high salinity water treatment and ZLD systems. In still other instances, the osmotic pressure of the draw solution may be at least 2000 psi at the regenerated concentrated state, in the case of high salinity water treatment and ZLD systems. In yet other instances, the osmotic pressure of the draw solution may be at least 3500 psi at the regenerated concentrated state.

A high osmotic pressure stems from a strong interaction of the draw compound with water molecules. It should be appreciated that a strong interaction between the draw solute and the water molecules originates from ionic force or hydrogen bonding. Additionally, the packing density and/or steric hindrance of the water molecules and draw solute affect the strength of the interaction to some degree. Taking into consideration these factors, it is possible to design and develop appropriate classes of materials which have remarkably high osmotic pressure, i.e., at least 3000 psi at or close to solubility limit. The trouble, which should be understandable and appreciated by one of skill in the art, is that such a high osmotic pressure draw compound is difficult to separate from water and no method is known for easy and low cost regeneration of the draw compound.

The osmotic pressure of the presently disclosed draw compounds depends on the application and the desired recovery. The presently disclosed draw solutes require higher osmotic pressure for high recovery in applications with process streams containing higher concentrations of dissolved solids. The draw solution osmotic pressure required for the exemplary systems and processes for forward osmosis water desalination of seawater is generally greater than ~400 psi, with greater than ~700 psi being preferred to allow for reasonable product flux and recovery.

Furthermore, the presently disclosed draw compounds may have a high solubility in the feed solvent as osmotic pressure generally increases with solute concentration. In at least some instances, the draw compound may have a solubility in the solvent of at least 20% in weight concentration. In other cases, the draw compound may have a solubility in the solvent of at least 50%. The presently disclosed draw compounds may be miscible with the solvent at any ratio. The solubility limit becomes particularly important with the increasing molecular weight of the polymeric draw compound as the solute may start to precipitate out of the solution, thereby no longer contributing to the osmotic pressure of the said solution. In at least some instances, the presently disclosed draw solutes or compounds may have a strong solubility dependence at the lower temperature range (e.g., close to 40° C.), which may be preferred so as to minimize the operating temperature of the regeneration steps in the process and to minimize resulting energy loss.

According to at least one aspect of the present disclosure, an ethylene oxide-propylene oxide (EO-PO) copolymer may be used as the draw compound for portable drinking water production and sea water desalination. The monomer ratio (EO/PO ratio) plays a critical role in material properties and membrane performance as the ratio affects osmotic pressure, cloud point, residual draw compound level in product water, and to a lesser degree the reverse solute diffusion. The presently disclosed draw compound may have a EO/PO ratio of from about 0.01 to about 10. In other instances, the draw compound may have a EO/PO ratio of from about 0.05 to about 5. In still other instances, the draw compound may have a EO/PO ratio in the range of from about 0.1 to about 1. In at least some instances, the draw compound may be an oligomer or low molecular weight polymer having a low EO/PO ratio so as to meet the requirement of cloud point and phase separation temperatures.

The molecular weight of a draw compound affects the viscosity of the draw solution. Additionally, solvent flux, residual draw solute level, and reverse solute diffusion are all related to the molecular weight. It should be appreciated that a low molecular weight inorganic and organic compound is highly desired from viscosity point of view as such a solution provides the most reduction in viscosity compared to a higher molecular weight oligomer and polymer. However, such a low molecular weight inorganic and organic compound may exhibit a high reverse solute diffusion and often cannot be regenerated effectively. Therefore, the molecular weight has to be selected carefully and the corresponding draw compound needs to have well balance performance. In at least some instances, the molecular weight of the draw compound may be from about 100 to about 25,000 in forward osmosis process. In other cases, the molecular weight of the draw solute may be from about 200 to 15,000. In yet other cases, the molecular weight of the draw solute may be from about 300 to about 5,000. In still other cases, the molecular weight of the draw compound may be from about 500 to about 3,500 in forward osmosis. While a low molecular weight is generally preferred, the molecular weight of the draw compound also needs to be high enough to allow effective polish filtering of the dissolved oligomer and polymer using nanofilter and/or reverse osmosis membrane in the post-treatment step.

According to at least one aspect of the present disclosure, the draw compound may be a narrow distributed linear or branched random or sequential oligomer or polymer chain comprising ethylene oxide monomer and propylene oxide monomer. In such cases, the draw compound may have a molecular weight from about 500 to about 1,200 and an EO/PO ratio of from 0.1 to 10.0, and a cloud point temperature from about 20° C. to about 100° C. According to this aspect of the present disclosure, the draw compound may further be characterized by a residual content less than 0.5% upon phase separation, a reverse diffusion through forward osmosis (FO) membranes of less than 0.1 GMH. According to this aspect, the oligomer or polymer chain may be temperature sensitive and have a temperature-dependent affinity with the feed solvent.

According to at least one aspect of the present disclosure, the draw compound may be a narrow distributed linear or branched random or sequential oligomer or polymer chain comprising ethylene oxide monomer and propylene oxide monomer. In such cases, the draw compound may have a molecular weight from about 800 to about 3,500 and an EO/PO ratio of from 0.05 to 5.0, and a cloud point temperature from about 50° C. to about 175° C. According to this aspect of the present disclosure, the draw compound may further be characterized by a residual content less than 0.5% upon phase separation, a reverse diffusion through forward osmosis (FO) membranes of less than 0.1 GMH. According to this aspect, the oligomer or polymer chain may be temperature sensitive and have a temperature-dependent affinity with the feed solvent.

According to at least one aspect of the present disclosure, the draw compound may be a narrow distributed linear or branched random or sequential oligomer or polymer chain comprising ethylene oxide monomer and propylene oxide monomer. In such cases, the draw compound may have a molecular weight from about 200 to about 5,000 and an EO/PO ratio of from 0.1 to 1.0, and a cloud point temperature from about 20° C. to about 100° C. According to this aspect of the present disclosure, the draw compound may further be characterized by a residual content less than 0.5% upon phase separation, a reverse diffusion through forward osmosis (FO) membranes of less than 0.1 GMH. According to this aspect, the oligomer or polymer chain may be temperature sensitive and have a temperature-dependent affinity with the feed solvent.

According to at least one aspect of the present disclosure, the draw compound may be a narrow distributed linear or branched random or sequential oligomer or polymer chain comprising ethylene oxide monomer and propylene oxide monomer. In such cases, the draw compound may have a molecular weight from about 1,200 to about 2,800 and an EO/PO ratio of from 0.25 to 1.0, and a cloud point temperature from about 40° C. to about 75° C. According to this aspect of the present disclosure, the draw compound may further be characterized by a residual content less than 0.5% upon phase separation, a reverse diffusion through forward osmosis (FO) membranes of less than 0.1 GMH. According to this aspect, the oligomer or polymer chain may be temperature sensitive and have a temperature-dependent affinity with the feed solvent.

According to at least one aspect of the present disclosure, the draw compound may be a narrow distributed linear or branched random or sequential oligomer or polymer chain comprising ethylene oxide monomer and propylene oxide monomer. In such cases, the draw compound may have a molecular weight from about 800 to about 3,500 and an EO/PO ratio of from 0.1 to 1.5, and a cloud point temperature from about 35° C. to about 80° C. According to this aspect of the present disclosure, the draw compound may further be characterized by a residual content less than 0.5% upon phase separation, a reverse diffusion through forward osmosis (FO) membranes of less than 0.1 GMH. According to this aspect, the oligomer or polymer chain may be temperature sensitive and have a temperature-dependent affinity with the feed solvent.

According to at least one aspect of the present disclosure, the draw compound may exhibit a reverse solute diffusion through forward osmosis membranes of from about 0.004 to about 0.01 GMH, or from about 0.01 to about 0.02 GMH, or from about 0.02 to about 0.035 GMH, or from about 0.004 GMH to about 0.035 GMH, or from about 0.004 GMH to about 0.1 GMH.

Within the constraints of osmotic pressure and cloud point temperature, the chemistry of the presently disclosed draw compounds may be selected such to control the molecular weight and/or physical structure of the polymer resulting in high rejection of the draw compound through filtration. In at least some instances, the draw compounds may be selected to cause the rejection of at least 90% of the draw compound through filtration. In other cases, the draw compounds may be selected to cause the rejection of at least 99% of the draw compound through filtration. In still other cases, the draw compounds may be selected to cause the rejection of at least 99.9% of the draw compound through filtration.

Further, the chemistry of the presently disclosed draw compounds may be selected to minimize back diffusion of the solute through a forward osmosis membrane. In at least some instances, for salt water desalination, the osmotic pressure of a draw solution containing 50% draw compound in water is greater than 400 psi. In other instances, the osmotic pressure of the draw solution containing 50% draw compound in water is greater than 550 psi. In still other instances, the osmotic pressure of the draw solution containing 50% draw compound in water is greater than 700 psi.

In at least some instances, the molecular weight of the draw compound is greater than 500. In other instances, the molecular weight of the draw compound may be greater than 1000. In still other instances, the molecular weight of the draw compound may be greater than 2000.

The chain end of the presently disclosed oligomeric and polymeric draw compound may undergo chemical alternation at operational and elevated temperatures with the reactive terminal group of hydroxyl, amine, and carboxylic, and the like. End capping of the reactive terminal groups enhances stability as well as modifies cloud point and osmotic pressure of the oligomeric and polymeric draw compounds. In at least some instances, a C3 or propyl group is capped on one end of the linear EO-PO copolymer, and the cloud point is reduced by 17° C. In general, known chemical reactions of hydroxyl, amine, and carboxylic groups can be used in end capping, and the suitable capping groups include, but are not limited to, allyl, phenyl, substituted or unsubstituted C1 to C14 alkyl groups, and substituted or unsubstituted aryl groups.

According to at least one aspect of the present disclosure, a nanofilter, ultrafilter or reverse osmosis filter may be selected to obtain a molecular weight cutoff of less than 2000. In other cases, the filter may be selected to obtain a molecular weight cutoff of less than 1000. In still other cases, the filter may be selected to obtain a molecular weight cutoff of less than 500.

In at least some instances, the filter may be selected to obtain a NaCl rejection of less than 50%. In other cases, the filter may be selected to obtain a NaCl rejection of less than 25%. In still other cases, the filter may be selected to obtain a NaCl rejection of less than 10%.

In at least some instances, the filter may be selected to obtain a solute rejection greater than 95%. In other instances, the filter may be selected to obtain a solute rejection of greater than 99%. In still other instances, the filter may be selected to obtain a solute rejection of greater than 99.9%. In other cases, the filter may be selected to obtain a solute rejection of greater than 99.99%.

Examples 1-8

Eight ethylene oxide-propylene oxide copolymers represented by Formula 1-2 were synthesized in accordance to the synthesis procedure described above. The copolymers have a linear chain structure with random ethylene oxide and propylene oxide distribution. The molecular weight of Examples 1-8 are within the range of from 500 to 2,000, and the EO/PO ratio is from 0.25 to 1.0.

Examples 9-11

Five ethylene oxide-propylene oxide copolymers represented by Formula 1-2 were synthesized in accordance to the synthesis procedure described above. The copolymers have a linear chain structure with random ethylene oxide and propylene oxide distribution. The molecular weight of Examples 9-11 are within the range of from 2,500 to 3,250, and the EO/PO ratio is from 0.53 to 1.0.

Examples 12-17

Six branched copolymers represented by Formulas 2-2, 2-3, and 2-4, were synthesized in accordance to the synthesis procedure described above. The starting compounds used in the preparation of the branched copolymers were glycerol, trimetholpropane, pentaerythritol, and sorbitol. The copolymers have a linear chain structure with random ethylene-oxide and propylene oxide distribution. The molecular weight of Examples 12-17 are within the range of from 1,200 to 2,500.

Evaluation of Osmotic Pressure

The draw solutions comprising the draw compounds of Examples 1-8 were prepared to have various concentrations. The osmotic pressure of each draw solution was measured by using an osmotic pressure measurement instrument (Vapro Vapor Pressure Osmometer, Model 5600, Wescor) in accordance to the presently disclosed measurement method. Table 1 shows the osmotic pressure measurements, as well as the molecular weight and EO/PO ratio for Examples 1-8. As shown in Table 1, the copolymers having a high EO/PO ratio and a low molecular weight have a comparatively higher osmotic pressure.

TABLE 1

| Draw Compound | Molecular Weight (Daltons) | EO/PO Ratio | Osmotic Pressure at 50% (psi) |
|---|---|---|---|
| Example 1 TL-1180 | 500 | 1.0 | 1606 |
| Example 2 TL-1180-1 | 1000 | 1.0 | 1052 |
| Example 3 TL-1180-2 | 2000 | 1.0 | 817 |
| Example 4 TL-1180-3 | 1500 | 1.0 | 978 |
| Example 5 TL-1180-4 | 1500 | 0.25 | 443 |
| Example 6 TL-1180-5 | 1500 | 0.35 | 485 |
| Example 7 TL-1180-6 | 1500 | 0.5 | 659 |
| Example 8 TL-1180-7 | 1500 | 0.75 | 798 |

Figure 3:
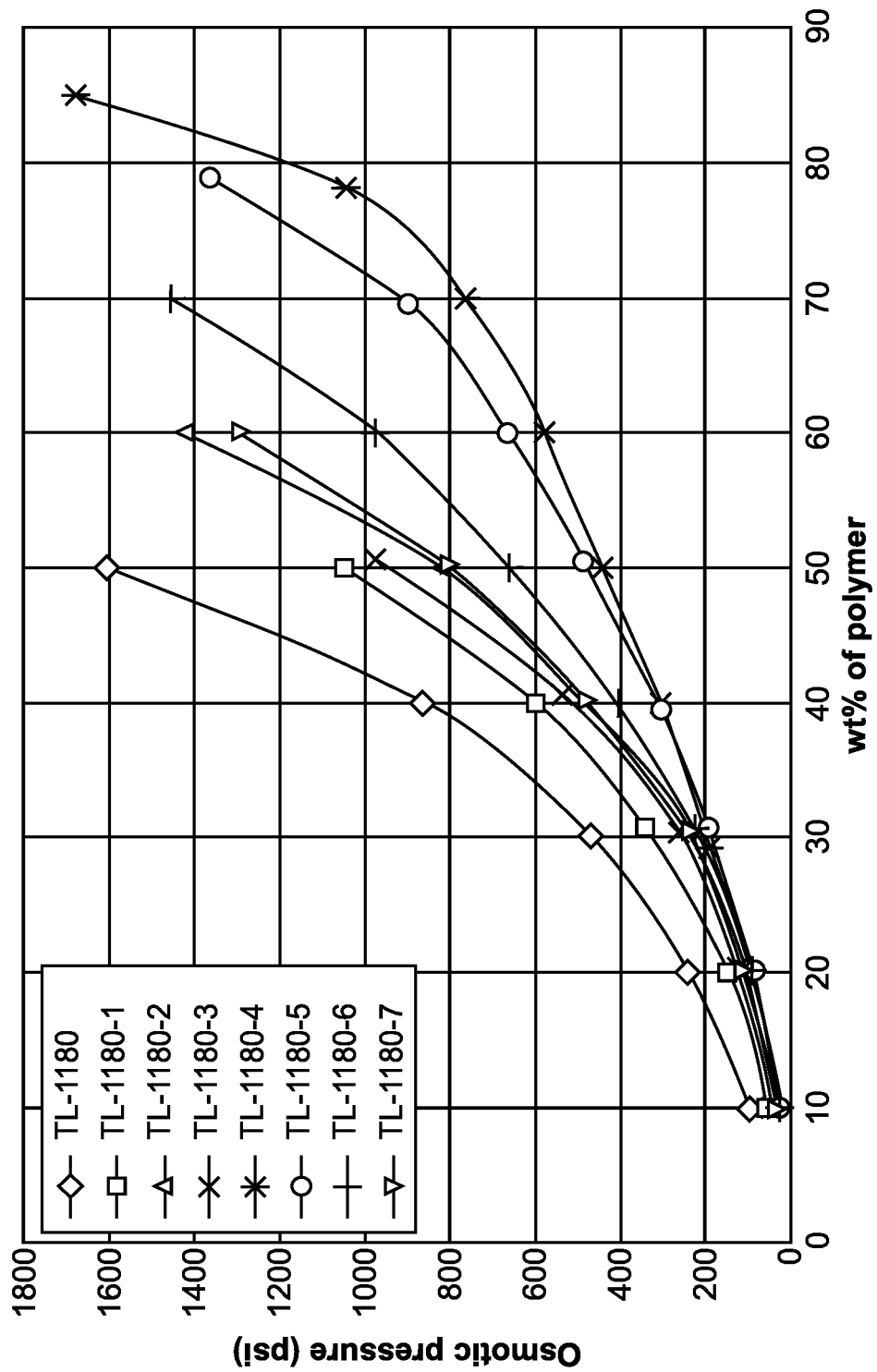
FIG. 3 is an illustration depicting osmotic pressure measurements of linear random copolymers, corresponding to the solutions of TL-1180, according to an example embodiment of the present disclosure.
Figure 4:
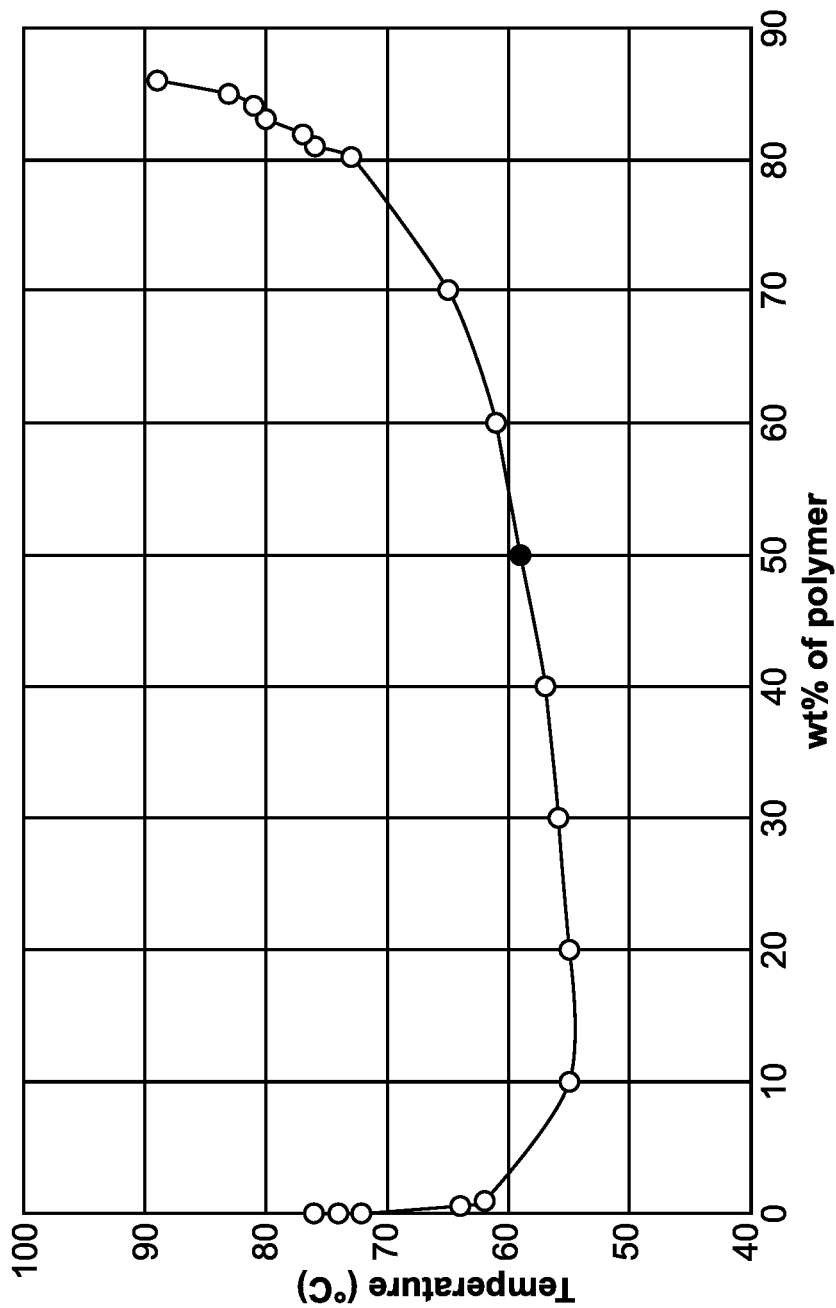
FIG. 4 is an illustration depicting a phase diagram of the draw compound of Example 11, according to an example embodiment of the present disclosure.

As shown in FIG. 3, the osmotic pressure of all eight copolymers increases sharply in concentrated state. Since a high osmotic pressure is the necessary condition to have a high solvent flux through a semipermeable membrane, one may be tempted to select the draw compound with the highest osmotic pressure. However, such a draw compound may not satisfy the requirements of low reverse solute diffusion and low residue in solvent-rich phase after phase separation. Hence, a systematic view is required in the selection of appropriate draw solutions.

The results of Table 1 and FIG. 2 confirm that a low molecular weight ethylene oxide-propylene oxide draw compound with appropriate EO/PO ratio may generate an osmotic pressure as high as 1600 psi at a concentration of 50% (Example 1). While other Example draw compounds have their curves below that of Example 1, the workable osmotic pressure can still be very high as long as a highly concentrated state can be reached upon draw solute regeneration. For example, Example 6 exhibits an osmotic pressure of 1450 psi at 70% concentration, and estimated to be above 2500 psi at 85% which can be achieved by a thermally induced phase separation process using waste heat as energy source.

Determination of Cloud Point

The draw solutions comprising a copolymer of Examples 1-8 were prepared to have a 1.0 wt % aqueous concentration. The aqueous solutions were heated at a heating rate of 0.5° C./min to at least 95° C. The onset temperature at which each draw solution becomes cloudy visually or exhibits a sharp drop in transmittance light intensity was determined as the cloud point. Table 2 shows the measurement results.

TABLE 2

| Draw Compound | Molecular Weight (Daltons) | EO/PO Ratio | Cloud Point (° C.) |
|---|---|---|---|
| Example 1 TL-1180 | 500 | 1.0 | >100° C. |
| Example 2 TL-1180-1 | 1000 | 1.0 | >100° C. |
| Example 3 TL-1180-2 | 2000 | 1.0 | 80.5° C. |
| Example 4 TL-1180-3 | 1500 | 1.0 | 93.5° C. |
| Example 5 TL-1180-4 | 1500 | 0.25 | 52.0° C. |
| Example 6 TL-1180-5 | 1500 | 0.35 | 55.0° C. |
| Example 7 TL-1180-6 | 1500 | 0.5 | 66.2° C. |
| Example 8 TL-1180-7 | 1500 | 0.75 | 82.0° C. |

As shown in Table 2, the draw compounds of Examples 1 to 8 have a cloud point from 52° C. to in excess of 100° C. Accordingly, these draw compounds may phase separate in the temperature range of interest and can be used in fluid purification and treatment systems. The copolymers with a relatively low cloud point may be preferred for applications such as portable drinking water production, sea water desalination, and waste water treatment, while the copolymers with a relatively higher cloud point may be preferred for zero-liquid discharge fluid and high salinity water treatment systems.

Determination of Residual Draw Compound

Residual draw compound in solvent-rich phase after thermal induced phase separation was determined by the following procedure. First, a 50 wt % temperature-sensitive draw compound solution was prepared. The solution was kept in room temperature for at least 2 hours to ensure homogenization. Next, the homogeneous solution was placed in a heated oven set at 85° C. to induce phase separation. For convenience, the solution was heated in the oven overnight. Upon phase separation, a solvent-rich layer was present at the top and a distinct solute-rich layer was clearly visible at the bottom of a glass container. A sample volume between 25-30 mL was carefully taken out of the solvent-rich layer. In typical testing, the solvent may be water and the draw solute may be an oligomer or polymer compound. The residual draw compound was measured by total organic carbon (TOC) on a Shimadzu Total Organic Carbon Analyzer (Model TOC-L). The results are compiled in Table 3.

TABLE 3

| Draw Compound | Molecular Weight (Daltons) | Cloud Point (° C.) | TOC (ppm) | Residue of draw solute |
|---|---|---|---|---|
| Example 9 TL-1150 | 3250 | 48.0 | 495 | 0.099% |
| Example 10 TL-1150-1 | 2800 | 69.8 | 4472 | 0.89% |
| Example 11 TL-1150-2 | 2500 | 60.0 | 1500 | 0.30% |

As shown in Table 3, it has been found that a slight increase in molecular weight, combined with a reduced cloud point in the copolymers, unexpectedly produces a large impact in the residual draw compound level after thermally induced phase separation, as evidenced by the drop of residual concentration from 0.89% for Example 10 to 0.099% for the Example 9 draw compound.

Evaluation of Membrane Performance

Membrane flux and reverse solute diffusion evaluation in forward osmosis mode is conducted with respect to the draw solutions including copolymers of Examples 10-15, respectively, in accordance with the following testing procedure. The membrane flux was determined with a Membrane Testing Fixture (Model II) designed and manufactured by Trevi Systems, and a Toyobo cellulose triacetate (CTA) hollow fiber FO module was utilized as a semi-permeable membrane. De-ionized water was fed as a feed solution and a 50 wt % draw compound solution was used as the draw solution. The volumetric flow rates of feed and draw solutions were selected to be close to the flow rates in commercial 5" and 10" hollow fiber membrane elements. The feed solution was faced toward the active layer of the hollow fibers. Both feed and draw solutions were circulated in close loops for at least 4 hours. The water flux and reverse solute diffusion were determined at the run time of 4 hours. The reverse solute diffusion from draw to feed solution through the membrane was measured by total organic carbon (TOC). The results are summarized in Table 4.

TABLE 4

| Polymer | Molecular Weight (Daltons) | Structure | Flux in FO Mode (LMH) | Reverse Solute Diffusion (GMH) |
|---|---|---|---|---|
| Example 10 TL-1150-1 | 2800 | Linear | 0.68 | 0.0326 |
| Example 11 TL-1150-2 | 2500 | Linear | 0.65 | 0.0298 |
| Example 12 TL-1371 | 2500 | 3-arm | 0.68 | 0.0154 |
| Example 13 TL-1374 | 2500 | 3-arm | 0.70 | 0.0092 |
| Example 14 TL-1373 | 2500 | 4-arm | 0.71 | 0.0149 |
| Example 15 TL-1379 | 2500 | 6-arm | 0.72 | 0.0048 |

Comparative measurements on membrane performance in FO and PRO (pressure retarded osmosis) modes were performed on Example 10 and Example 11 draw compounds. The tests differed in that the feed solution was faced toward the active layer of the semi-permeable membrane in FO mode while the draw solution was in contact with the active layer of the semi-permeable membrane in PRO mode. The results are shown in Table 5.

TABLE 5

| Polymer | Molecular Weight (Daltons) | Flux in FO Mode (LMH) | Reverse Solute Diffusion in FO Mode (GMH) | Flux in PRO Mode (LMH) | Reverse Solute Diffusion in PRO Mode (GMH) |
|---|---|---|---|---|---|
| Example 10 TL-1150-1 | 2800 | 0.68 | 0.0326 | 1.4 | 0.0186 |
| Example 11 TL-1150-2 | 2500 | 0.65 | 0.0298 | 1.5 | 0.0137 |

It is apparent that superior membrane performance is realized in PRO mode in comparison to the FO mode. The flux is more than doubled and the reverse solute diffusion is cut to half in PRO mode comparatively. While it may be advantageous to perform the forward osmotic fluid treatment process in PRO mode in certain applications, such a mode may not be practical due to the tendency of membrane fouling which is the result of direct contact of feed fluid to the support layer of the semipermeable membranes.

It should be Noted that the Flux in Table 5 is the Result of the Membrane Testing procedure used herein, and may not be representative of results achieved in a practical forward osmosis process. As shown in FIG. 3, the phase diagram of Example 11 indicates that the draw compound can be regenerated by up to 85% at a temperature of 85° C. Although a direct measurement is not available, the osmotic pressure of Example 11 is estimated to be above 2,500 psi at 85% concentration compared to approximately 620 psi at 50%. Thus, the flux through a semipermeable membrane is expected to be much higher when a concentrated solution higher than 50% is utilized as the draw solution.

Flux Evaluation of Low Molecular Weight Branched Draw Compounds

Low molecular weight branched draw compounds were synthesized wherein Example 18 and Example 19 were 3-arm and a 4-arm random ethylene oxide-propylene oxide copolymers, respectively. Molecular weight and distribution were analyzed by a Shimadzu LC-20AD Liquid Chromatograph/Gel Permeation Chromatograph (GPC) equipped with SIL-20A auto sampler, DGU-20A degassing unit, DID-10A refractive index detector, CTO-20AC column oven, CBM-20A communication bus module, and LCsolution software. The column bank includes three Phenomenex Phenogel 5µ GPC columns with a pore size of 50 Å, 500 Å, and $10^4$ Å. The number-average molecular weight ($M_n$) and weight average molecular weight ($M_w$) of the copolymer were calculated based on polyethylene glycol standards calibration. The molecular characteristics are summarized in Table 6.

TABLE 6

| Draw Compound | $M_n$ | $M_w$ | $M_w/M_n$ |
|---|---|---|---|
| Example 18 TL-1435 | 1479 | 1568 | 1.06 |
| Example 19 DLW-1600 | 1177 | 1250 | 1.07 |

The flux through the semi-permeable membrane was determined in accordance to the testing procedure described previously with respect to Examples 18 and 19 above. Again, a 50 wt % draw compound solution was used as the draw solution while de-ionized water was used as the feed solution. As shown in Table 7, the flux at run time of 4 hours is 0.92 LMH, which was 42% higher as compared to the linear polymer of Example 11.

TABLE 7

| Polymer | Flux in FO Mode (LMH) | Reverse Solute Diffusion in FO Mode (GMH) | Flux in PRO Mode (LMH) | Reverse Solute Diffusion in PRO Mode (GMH) |
| --- | --- | --- | --- | --- |
| Example 18 TL-1435 | | | 1.3 | 0.0065 |
| Example 19 DLW-1600 | 0.92 | 0.128 | 1.5 | 0.044 |

Evaluation of End-Capped Draw Compounds

Exemplary one end-capped C1 (methyl) and C3 (propyl) random ethylene oxide-propylene oxide copolymers were evaluated in accordance to the standard testing procedure. The results are compiled in Table 8 and compared to a reference draw compound of linear EO-PO copolymer with the same molecular weight and terminal hydroxyl groups at both chain ends.

TABLE 8

| Draw Compound | End Capping | Osmotic Pressure at 50% (psi) | Osmotic Pressure at 70% (psi) | Cloud Point (° C.) |
| --- | --- | --- | --- | --- |
| Example 20 TL-1300 | C1, one end | 567 | 1156 | 56 |
| Example 21 TL-1301 | C3, one end | 476 | 952 | 45 |
| Reference (TL-1150-2) | None | 586 | 1277 | 62 |

Figure 5:
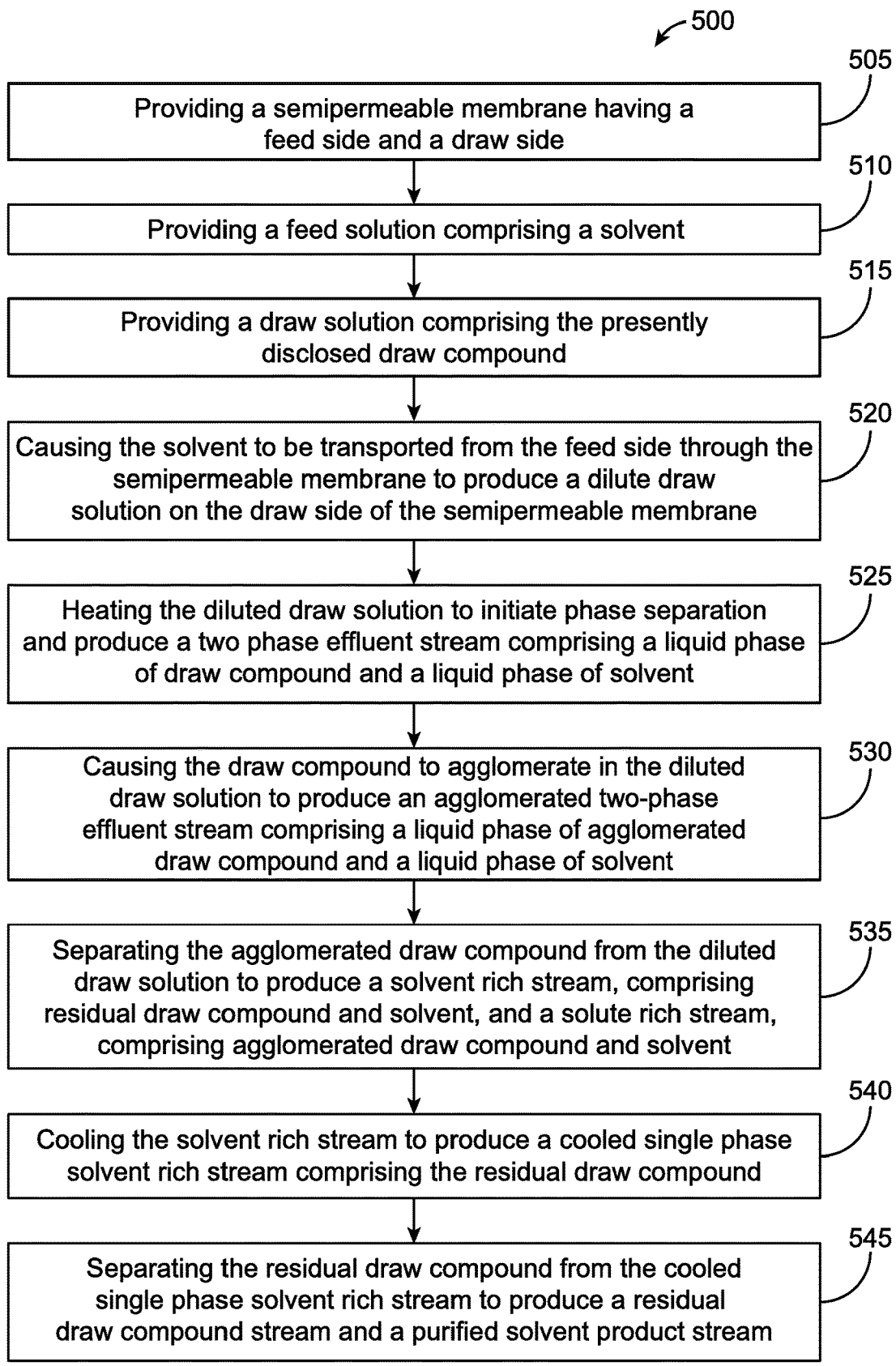
FIG. 5 is a flow chart describing a method of using the presently disclosed draw compound to purify or treat a feed solution according to a forward osmosis process, according to an example embodiment of the present disclosure.

According to at least one aspect of the present disclosure, a method for purifying or treating a feed solution using the presently disclosed draw compounds and solutions is provided. FIG. 5 is a flow chart describing a method 500 of using the presently disclosed draw compound to purify or treat a feed solution, according to a forward osmosis process. Referring to FIG. 5, a flow chart is presented in accordance with an example embodiment. The example method shown in FIG. 5 is provided by way of an example, as there are a variety of ways to carry out the method. The illustrated order of blocks is illustrative only and the order of the blocks can change according to the present disclosure. Additional blocks can be added or fewer blocks can be utilized, without departing from this disclosure.

The method 500 can begin at block 505. At block 505, a semipermeable membrane having a feed side and a draw side is provided. At block 510, a feed solution comprising a solvent and having a first osmotic pressure is provided. A draw solution comprising a draw compound and having a second osmotic pressure is provided at block 515. At block 520, at least a portion of the solvent of the feed solution is caused to be transported from the feed side through the semipermeable membrane to produce a dilute draw solution on the draw side of the semipermeable membrane. The diluted draw solution is heated at block 525 so as to initiate phase separation and produce a two phase effluent stream comprising a liquid phase of draw compound and a liquid phase of solvent. At block 530, the draw compound is caused to agglomerate in the diluted draw solution to produce an agglomerated two-phase effluent stream comprising a liquid phase of agglomerated draw compound and a liquid phase of solvent. The agglomerated draw compound is separated from the diluted draw solution at block 535 to produce a solvent rich stream, comprising residual draw compound and solvent, and a solute rich stream, comprising agglomerated draw compound and solvent. At block 540, the solvent rich stream is cooled to produce a cooled single phase solvent rich stream comprising the residual draw compound. At block 545, the residual draw compound is separated from the cooled single phase solvent rich stream to produce a residual draw compound stream and a purified solvent product stream. In at least some instances, the solvent may be water. For instance, the method 500 may be used to treat or purify sea water, brackish water, industrial and municipal waste water, contaminated water, and the like.

Example embodiments have been described hereinabove regarding improved systems and processes for forward osmosis water purification or desalination. The embodiments shown and described above are only examples. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure to the full extent indicated by the broad general meaning of the terms used in the attached claims. Various modification to and departure from the disclosed example embodiments will occur to those having ordinary skill in the art. It will therefore be appreciated that the embodiments described above may be modified within the scope of the appended claims.

Statements of the Disclosure Include:

Statement 1: A draw compound for osmotic fluid purification, the draw compound comprising: a linear random, sequential, or block molecular chain including at least one oxides monomer or diol monomer, wherein the molecular chain including the at least one epoxide monomer or diol monomer, is temperature-sensitive and has a temperature-dependent affinity with a feed solvent, and wherein the draw compound further comprises a first terminal group and a second terminal group, at least one of the first terminal group and the second terminal group selected from the group consisting of a hydroxyl group, an amine group, a carboxylic group, an allyl group, and a C1 to C14 substituted and unsubstituted alky group.

Statement 2: A draw compound according to Statement 1, wherein the at least one oxide monomer is selected from the group consisting of ethylene oxide, propylene oxide, 1,2-epoxy-butane, 2,3-epoxy-butane, styrene oxide, epifluohydrin, epichlorohydrin, tetrahydrofuran, oxetane, dioxilane, trioxane, butyl glycidyl ether, phenyl glycidyl ether, and allyl glycidyl ether.

Statement 3: A draw compound according to Statement 1 or Statement 2, wherein the at least one diol monomer is selected from the group consisting of 1,2-ethanediol, 1,2-propanediol, 1,3-propanediol, 1,4-butanediol, 1,5-pentanediol, 2-methyl-2-propyl-1,3-propanediol, neopentyl glycol, resorcinol, and 4,4'-(propane-2,2-diyl)diphenol.

Statement 4: A draw compound according to any one of the preceding Statements 1-3, wherein the draw compound is a linear random oligomer or copolymer of ethylene oxide, propylene oxide, and butylene oxide.

Statement 5: A draw compound according to any one of the preceding Statements 1-4, wherein the draw compound is a linear random oligomer or copolymer of ethylene oxide and propylene oxide.

Statement 6: A draw compound according to any one of the preceding Statements 1-5, wherein the draw compound has a molecular weight of from 100 to 25,000.

Statement 7: A draw compound according to any one of the preceding Statements 1-5, wherein the draw compound has a molecular weight of from 200 to 5,000.

Statement 8: A draw compound according to any one of the preceding Statements 1-5, wherein the draw compound has a molecular weight of from 500 to 3,500.

Statement 9: A draw compound according to any one of the preceding Statements 1-5, wherein the draw compound has a molecular weight of from 800 to 2,800.

Statement 10: A draw compound according to any one of the preceding Statements 1-9, wherein the draw compound has an EO/PO ratio from 0.01 to 10.0.

Statement 11: A draw compound according to any one of the preceding Statements 1-9, wherein the draw compound has an EO/PO ratio from 0.05 to 5.0.

Statement 12: A draw compound according to any one of the preceding Statements 1-9, wherein the draw compound has an EO/PO ratio from 0.1 to 1.0.

Statement 13: A draw compound according to any one of the preceding Statements 1-12, wherein the draw compound has a cloud point temperature from 20° C. to 175° C.

Statement 14: A draw compound according to any one of the preceding Statements 1-12, wherein the draw compound has a cloud point temperature from 35° C. to 125° C.

Statement 15: A draw compound according to any one of the preceding Statements 1-12, wherein the draw compound has a cloud point temperature from 40° C. to 80° C.

Statement 16: A draw compound for osmotic fluid purification, the draw compound comprising: a branched random, sequential, or block molecular chain including at least one oxide monomer or diol monomer, wherein the molecular chain including at least one oxide monomer or diol monomer is temperature-sensitive and has a temperature-dependent affinity with a feed solvent, and wherein the draw compound further comprises a first terminal group and a second terminal group, at least one of the first terminal group and the second terminal group selected from the group consisting of a hydroxyl group, an amine group, a carboxylic group, an allyl group, and a C1 to C14 substituted and unsubstituted alky group.

Statement 17: A draw compound according to Statement 16, wherein the draw compound has three or more branches, each branch comprising one or more epoxide monomers selected from of the group consisting of ethylene oxide, propylene oxide, 1,2-epoxy-butane, 2,3-epoxy-butane, styrene oxide, epifluohydrin, epichlorohydrin, tetrahydrofuran, oxetane, dioxilane, trioxane, butyl glycidyl ether, phenyl glycidyl ether, and allyl glycidyl ether.

Statement 18: A draw compound according to Statement 16, wherein the draw compound has three or more branches, each branch comprising one or more diol monomers selected from the group consisting of 1,2-ethanediol, 1,2-propanediol, 1,3-propanediol, 1,4-butanediol, 1,5-pentanediol, 2-methyl-2-propyl-1,3-propanediol, neopentyl glycol, resorcinol, and 4,4'-(propane-2,2-diyl)diphenol.

Statement 19: A draw compound according to any one of the preceding Statements 16-18, wherein the starting compound for the preparation of the draw compound is selected from the group consisting of vitamins and sugar alcohols.

Statement 20: A draw compound according to any one of the preceding Statements 16-18, wherein the starting compound for the preparation of the draw compound is selected from the group consisting of polyols, glycerol, trimethylolpropane, pentaerythritol, diglycerol, ditrimethylolpropane, phloroglucinol, sorbitol, sorbitan, glucose, fructose, and methyl glucoside.

Statement 21: A draw compound according to any one of the preceding Statements 16-18, wherein the starting compound for the preparation of the draw compound is selected from the group consisting of ascorbic acid, glycerol, erythritol, threitol arabitol, ribitol, xylitol, fructitol, galacititol, iditol, inositol, mannitol, sorbitol, volemitol, isomalt, maltitol, and lactitol.

Statement 22: A draw compound according to any one of the preceding Statements 16-21, wherein the draw compound is a branched random oligomer or copolymer of ethylene oxide, propylene oxide, and butylene oxide.

Statement 23: A draw compound according to any one of the preceding Statements 16-21, wherein the draw compound is a branched random oligomer or copolymer of ethylene oxide and propylene oxide.

Statement 24: A draw compound according to any one of the preceding Statements 16-23, wherein the draw compound has a molecular weight from 100 to 25,000.

Statement 25: A draw compound according to any one of the preceding Statements 16-23, wherein the draw compound has a molecular weight from 200 to 5,000.

Statement 26: A draw compound according to any one of the preceding Statements 16-23, wherein the draw compound has a molecular weight from 500 to 3,500.

Statement 27: A draw compound according to any one of the preceding Statements 16-23, wherein the draw compound has a molecular weight of from 800 to 2,800.

Statement 28: A draw compound according to any one of the preceding Statements 16-27, wherein the draw compound has an EO/PO ratio from 0.01 to 10.0.

Statement 29: A draw compound according to any one of the preceding Statements 16-27, wherein the draw compound has an EO/PO ratio from 0.05-5.0.

Statement 30: A draw compound according to any one of the preceding Statements 16-27, wherein the draw compound has an EO/PO ratio from 0.1-1.0.

Statement 31: A draw compound according to any one of the preceding Statements 16-30, wherein the draw compound has a cloud point temperature from 20° C. to 100° C.

Statement 32: A draw compound according to any one of the preceding Statements 16-30, wherein the draw compound has a cloud point temperature from 35° C. to 125° C.

Statement 33: A draw compound according to any one of the preceding Statements 16-30, wherein the draw compound has a cloud point temperature from 40° C. to 80° C.

Statement 34: A draw compound according to Statement 23, wherein the draw compound is a 3-arm branched random oligomer or copolymer and the starting compound is glycerol.

Statement 35: A draw compound according to Statement 23, wherein the draw compound is a 3-arm branched random oligomer or copolymer and the starting compound is trimethylolpropane.

Statement 36: A draw compound according to Statement 23, wherein the draw compound is a 4-arm branched random oligomer or copolymer and the starting compound is pentaerythritol.

Statement 37: A draw compound according to Statement 23, wherein the draw compound is a 6-arm branched random oligomer or copolymer and the starting compound is sorbitol.

Statement 38: A draw solution for osmotic fluid purification, the draw solution comprising the draw compound according to of any of the preceding Statements 1-37.

Statement 39: A system for purifying water, the system comprising: a feed solvent source; a draw solution comprising a draw compound; a semipermeable membrane comprising a feed side for receiving, from the feed solvent source, a feed solvent stream having a first osmotic pressure and a draw side for receiving the draw solution having a second osmotic pressure, wherein a diluted draw solution stream is produced when solvent passes from the feed solvent stream to the draw side via the semipermeable membrane; wherein the draw compound comprises a linear random, sequential, or block molecular chain consisting of at least one epoxide monomer or diol monomer, wherein the molecular chain including at least one epoxide monomer or diol monomer, is temperature-sensitive and has a temperature-dependent affinity with a feed solvent, and wherein the draw compound further comprises a first terminal group and a second terminal group, at least one of the first terminal group and the second terminal group selected from the group consisting of a hydroxyl group, an amine group, a carboxylic group, an allyl group, and a C1 to C14 substituted and unsubstituted alky group.

Statement 40: A system according to Statement 39, further comprising: a first heat exchanger to heat the diluted draw solution stream; a coalescer configured to agglomerate the draw compound in the diluted draw solution stream to produce an agglomerated two phase effluent stream comprising a liquid phase of agglomerated draw compound and a liquid phase of solvent; a liquid phase separator capable of separating two or more immiscible liquids or solutions, the liquid phase separator configured to separate agglomerated draw compound from the agglomerated two phase effluent stream to produce a solvent rich stream comprising solvent and residual draw compound, and a draw compound rich stream comprising the agglomerated draw compound and solvent; a second heat exchanger for cooling the solvent rich stream to produce a cooled single phase solvent rich stream; and a filtration module for separating the residual draw compound from the cooled single phase solvent rich stream to produce a residual draw compound stream and a purified solvent product stream.

Statement 41: A system according to Statement 40, wherein the filtration module is selected from the group consisting of a nanofilter, an ultrafilter, and a reverse osmosis module.

Statement 42: A system according to any one of the preceding Statements 39-41, wherein the at least one oxide monomer is selected from the group consisting of ethylene oxide, propylene oxide, 1,2-epoxy-butane, 2,3-epoxy-butane, styrene oxide, epifluohydrin, epichlorohydrin, tetrahydrofuran, oxetane, dioxilane, trioxane, butyl glycidyl ether, phenyl glycidyl ether, and allyl glycidyl ether.

Statement 43: A system according to any one of the preceding Statements 39-42, wherein the at least one diol monomer is selected from the group consisting of 1,2-ethanediol, 1,2-propanediol, 1,3-propanediol, 1,4-butanediol, 1,5-pentanediol, 2-methyl-2-propyl-1,3-propanediol, neopentyl glycol, resorcinol, and 4,4'-(propane-2,2-diyl)diphenol.

Statement 44: A system according to any one of the preceding Statements 39-43, wherein the draw compound is a linear random oligomer or copolymer of ethylene oxide, propylene oxide, and butylene oxide.

Statement 45: A system according to any one of the preceding Statements 39-43, wherein the draw compound is a linear random oligomer or copolymer of ethylene oxide and propylene oxide.

Statement 46: A system according to any one of the preceding Statements 39-45, wherein the draw compound has a molecular weight of from 100 to 25,000.

Statement 47: A system according to any one of the preceding Statements 39-46, wherein the draw compound has an EO/PO ratio from 0.01 to 10.0.

Statement 48: A system according to any one of the preceding Statements 39-47, wherein the draw compound has a cloud point temperature from 20° C. to 175° C.

Statement 49: A system for purifying a solution, the system comprising: a feed solvent source; a draw solution comprising a draw compound; a semipermeable membrane comprising a feed side for receiving, from the feed solvent source, a feed solvent stream having a first osmotic pressure and a draw side for receiving the draw solution having a second osmotic pressure, wherein a diluted draw solution stream is produced when solvent passes from the feed solvent stream to the draw side via the semipermeable membrane; wherein the draw compound comprises a branched random, sequential, or block molecular chain consisting of at least one oxide monomer or diol monomer, wherein the molecular chain including at least one oxide monomer or diol monomer is temperature-sensitive and has a temperature-dependent affinity with a feed solvent, and wherein the draw compound further comprises a first terminal group and a second terminal group, at least one of the first terminal group and the second terminal group selected from the group consisting of a hydroxyl group, an amine group, a carboxylic group, an allyl group, and a C1 to C14 substituted and unsubstituted alky group.

Statement 50: A system according to Statement 49, further comprising: a first heat exchanger to heat the diluted draw solution stream; a coalescer configured to agglomerate the draw compound in the diluted draw solution stream to produce an agglomerated two phase effluent stream comprising a liquid phase of agglomerated draw compound and a liquid phase of solvent; a liquid phase separator capable of separating two or more immiscible liquids or solutions, the liquid phase separator configured to separate agglomerated draw compound from the agglomerated two phase effluent stream to produce a solvent rich stream comprising solvent and residual draw compound, and a draw compound rich stream comprising the agglomerated draw compound and solvent; a second heat exchanger for cooling the solvent rich stream to produce a cooled single phase solvent rich stream; and a filtration module for separating the residual draw compound from the cooled single phase solvent rich stream to produce a residual draw compound stream and a purified solvent product stream.

Statement 51: A system according to Statement 50, wherein the filtration module is selected from the group consisting of a nanofilter, an ultrafilter, and a reverse osmosis module.

Statement 52: A system according to any one of the preceding Statements 49-51, wherein the draw compound has three or more branches, each branch comprising one or more epoxide monomers selected from of the group consisting of ethylene oxide, propylene oxide, 1,2-epoxy-butane, 2,3-epoxy-butane, styrene oxide, epifluohydrin, epichlorohydrin, tetrahydrofuran, oxetane, dioxilane, trioxane, butyl glycidyl ether, phenyl glycidyl ether, and allyl glycidyl ether.

Statement 53: A system according to any one of the preceding Statements 49-51, wherein the draw compound has three or more branches, each branch comprising one or more diol monomers selected from the group consisting of 1,2-ethanediol, 1,2-propanediol, 1,3-propanediol, 1,4-butanediol, 1,5-pentanediol, 2-methyl-2-propyl-1,3-propanediol, neopentyl glycol, resorcinol, and 4,4'-(propane-2,2-diyl)diphenol.

Statement 54: A system according to any one of the preceding Statements 49-53, wherein the draw compound is a branched random oligomer or copolymer of ethylene oxide, propylene oxide, and butylene oxide.

Statement 55: A system according to any one of the preceding Statements 49-53, wherein the draw compound is a branched random oligomer or copolymer of ethylene oxide and propylene oxide.

Statement 56: A system according to any one of the preceding Statements 49-55, wherein the draw compound has a molecular weight from 100 to 25,000.

Statement 57: A system according to any one of the preceding Statements 49-56, wherein the draw compound has an EO/PO ratio from 0.01 to 10.0.

Statement 58: A system according to any one of the preceding Statements 49-57, wherein the draw compound has a cloud point temperature from 20° C. to 175° C.

Statement 59: A method for purifying or treating a feed solution, the method comprising: providing a semipermeable membrane having a feed side and a draw side; providing a feed solution comprising a solvent and having a first osmotic pressure; providing a draw solution comprising a draw compound and having a second osmotic pressure, wherein the draw compound comprises a branched random, sequential, or block molecular chain consisting of at least one oxide monomer or diol monomer, wherein the molecular chain including at least one oxide monomer or diol monomer is temperature-sensitive and has a temperature-dependent affinity with a feed solvent, and wherein the draw compound further comprises a first terminal group and a second terminal group, at least one of the first terminal group and the second terminal group selected from the group consisting of a hydroxyl group, an amine group, a carboxylic group, an allyl group, and a C1 to C14 substituted and unsubstituted alky group; causing the solvent to be transported from the feed side through the semipermeable membrane to produce a dilute draw solution on the draw side of the semipermeable membrane; heating the diluted draw solution to initiate phase separation and produce a two phase effluent stream comprising a liquid phase of draw compound and a liquid phase of solvent; causing the draw compound to agglomerate in the diluted draw solution to produce an agglomerated two-phase effluent stream comprising a liquid phase of agglomerated draw compound and a liquid phase of solvent; separating the agglomerated draw compound from the diluted draw solution to produce a solvent rich stream, comprising residual draw compound and solvent, and a solute rich stream, comprising agglomerated draw compound and solvent; cooling the solvent rich stream to produce a cooled single phase solvent rich stream comprising the residual draw compound; and separating the residual draw compound from the cooled single phase solvent rich stream to produce a residual draw compound stream and a purified solvent product stream.

Statement 60: A method according to Statement 59, wherein the draw compound has three or more branches, each branch comprising one or more epoxide monomers selected from of the group consisting of ethylene oxide, propylene oxide, 1,2-epoxy-butane, 2,3-epoxy-butane, styrene oxide, epifluohydrin, epichlorohydrin, tetrahydrofuran, oxetane, dioxilane, trioxane, butyl glycidyl ether, phenyl glycidyl ether, and allyl glycidyl ether.

Statement 61: A method according to Statement 59, wherein the draw compound has three or more branches, each branch comprising one or more diol monomers selected from the group consisting of 1,2-ethanediol, 1,2-propanediol, 1,3-propanediol, 1,4-butanediol, 1,5-pentanediol, 2-methyl-2-propyl-1,3-propanediol, neopentyl glycol, resorcinol, and 4,4'-(propane-2,2-diyl)diphenol.

Statement 62: A method according to Statement 59, wherein the draw compound is a branched random oligomer or copolymer of ethylene oxide, propylene oxide, and butylene oxide.

Statement 63: A method according to Statement 59, wherein the draw compound is a branched random oligomer or copolymer of ethylene oxide and propylene oxide.

Statement 64: A method according to any one of the preceding Statements 59-63, wherein the draw compound has a molecular weight from 100 to 25,000.

Statement 65: A method according to any one of the preceding Statements 59-64, wherein the draw compound has an EO/PO ratio from 0.01 to 10.0.

Statement 66: A method according to any one of the preceding Statements 59-63, wherein the draw compound has a cloud point temperature from 20° C. to 175° C.

Statement 67: A draw compound for osmotic fluid purification, the draw compound comprising: a narrow distributed linear or branched random or sequential oligomer or polymer chain comprising ethylene oxide monomer and propylene oxide monomer.

Statement 68: A draw compound according to Statement 67, wherein the draw compound has a molecular weight of from 500 to 3,500.

Statement 69: A draw compound according to Statement 67, wherein the draw compound has a molecular weight of from 800 to 3,000.

Statement 70: A draw compound according to Statement 67, wherein the draw compound has a molecular weight of from 1,200 to 2,800.

Statement 71: A draw compound according to Statement 67, wherein the draw compound has a molecular weight of from 800 to 2,800.

Statement 72: A draw compound according to any one of the preceding Statements 67-71, wherein the draw compound has an EO/PO ratio from 0.01 to 10.0.

Statement 73: A draw compound according to any one of the preceding Statements 67-71, wherein the draw compound has an EO/PO ratio from 0.1 to 1.5.

Statement 74: A draw compound according to any one of the preceding Statements 67-71, wherein the draw compound has an EO/PO ratio from 0.25 to 1.0.

Statement 75: A draw compound according to any one of the preceding Statements 67-74, wherein the draw compound has a cloud point temperature from 20° C. to 100° C.

Statement 76: A draw compound according to any one of the preceding Statements 67-74, wherein the draw compound has a cloud point temperature from 35° C. to 80° C.

Statement 77: A draw compound according to any one of the preceding Statements 67-74, wherein the draw compound has a cloud point temperature from 40° C. to 75° C.

Statement 78: A draw compound according to any one of the preceding Statements 67-77, wherein the draw compound exhibits a residual content less than 0.5% upon phase separation.

Statement 79: A draw compound according to any one of the preceding Statements 67-78, wherein the draw compound exhibits a reverse solute diffusion through forward osmosis membranes of from about 0.004 to about 0.01 GMH.

Statement 80: A draw compound according to any one of the preceding Statements 67-78, wherein the draw compound exhibits a reverse solute diffusion through forward osmosis membranes of from about 0.01 to about 0.02 GMH.

Statement 81: A draw compound according to any one of the preceding Statements 67-78, wherein the draw compound exhibits a reverse solute diffusion through forward osmosis membranes of from about 0.02 to about 0.035 GMH.

Statement 82: A draw compound according to any one of the preceding Statements 67-78, wherein the draw compound exhibits a reverse solute diffusion through forward osmosis membranes of from about 0.004 GMH to about 0.035 GMH.

Statement 83: A draw compound according to any one of the preceding Statements 67-78, wherein the draw compound exhibits a reverse solute diffusion through forward osmosis membranes of from about 0.004 GMH to about 0.1 GMH.

Statement 84: A draw compound according to any one of the preceding Statements 67-78, wherein the draw compound exhibits a reverse solute diffusion through forward osmosis membranes of less than 0.1 GMH.

Statement 85: A draw compound according to any one of the preceding Statements 67-84, wherein the oligomer or polymer chain of the draw compound is temperature sensitive and has a temperature-dependent affinity with the feed solvent.

Statement 86: A system for purifying water, the system comprising: a feed solvent source; a draw solution comprising a draw compound according to any one of Statements 1-37 or Statements 67-85; a semipermeable membrane comprising a feed side for receiving, from the feed solvent source, a feed solvent stream having a first osmotic pressure and a draw side for receiving the draw solution having a second osmotic pressure, wherein a diluted draw solution stream is produced when solvent passes from the feed solvent stream to the draw side via the semipermeable membrane.

Statement 87: A system according to Statement 86, further comprising: a first heat exchanger to heat the diluted draw solution stream; a coalescer configured to agglomerate the draw compound in the diluted draw solution stream to produce an agglomerated two phase effluent stream comprising a liquid phase of agglomerated draw compound and a liquid phase of solvent; a liquid phase separator capable of separating two or more immiscible liquids or solutions, the liquid phase separator configured to separate agglomerated draw compound from the agglomerated two phase effluent stream to produce a solvent rich stream comprising solvent and residual draw compound, and a draw compound rich stream comprising the agglomerated draw compound and solvent; a second heat exchanger for cooling the solvent rich stream to produce a cooled single phase solvent rich stream; and a filtration module for separating the residual draw compound from the cooled single phase solvent rich stream to produce a residual draw compound stream and a purified solvent product stream.

Statement 88: A method for purifying or treating a feed solution, the method comprising: providing a semipermeable membrane having a feed side and a draw side; providing a feed solution comprising a solvent and having a first osmotic pressure; providing a draw solution comprising a draw compound according to any one of the Statements 1-37 or 67-85 and having a second osmotic pressure; causing the solvent to be transported from the feed side through the semipermeable membrane to produce a dilute draw solution on the draw side of the semipermeable membrane; heating the diluted draw solution to initiate phase separation and produce a two phase effluent stream comprising a liquid phase of draw compound and a liquid phase of solvent; causing the draw compound to agglomerate in the diluted draw solution to produce an agglomerated two-phase effluent stream comprising a liquid phase of agglomerated draw compound and a liquid phase of solvent; separating the agglomerated draw compound from the diluted draw solution to produce a solvent rich stream, comprising residual draw compound and solvent, and a solute rich stream, comprising agglomerated draw compound and solvent; cooling the solvent rich stream to produce a cooled single phase solvent rich stream comprising the residual draw compound; and separating the residual draw compound from the cooled single phase solvent rich stream to produce a residual draw compound stream and a purified solvent product stream.

What is claimed is:

1. A system for purifying water, the system comprising:
    a feed solvent source;
    a draw solution comprising a draw compound;
    a semipermeable membrane comprising a feed side for receiving, from the feed solvent source, a feed solvent stream having a first osmotic pressure and a draw side for receiving the draw solution having a second osmotic pressure, wherein a diluted draw solution stream is produced when solvent passes from the feed solvent stream to the draw side via the semipermeable membrane;
    wherein the draw compound comprises a linear random, sequential, or block molecular chain consisting of at least one epoxide monomer selected from the group consisting of styrene oxide, epifluorohydrin, epichlorohydrin, oxetane, dioxilane, trioxane, butyl glycidyl ether, phenyl glycidyl ether, and allyl glycidyl ether, wherein the molecular chain including at least one epoxide monomer is temperature-sensitive and has a temperature-dependent affinity with a feed solvent in the feed solvent stream, and
    wherein the draw compound further comprises a first terminal group and a second terminal group, at least one of the first terminal group and the second terminal group selected from the group consisting of a hydroxyl group, an amine group, a carboxylic group, an allyl group, and a C1 to C14 substituted and unsubstituted alkyl group.

2. The system according to claim 1, further comprising:
    a first heat exchanger to heat the diluted draw solution stream;
    a coalescer configured to agglomerate the draw compound in the diluted draw solution stream to produce an agglomerated two phase effluent stream comprising a liquid phase of agglomerated draw compound and a liquid phase of solvent;
    a liquid phase separator capable of separating two or more immiscible liquids or solutions, the liquid phase separator configured to separate the agglomerated draw compound from the agglomerated two phase effluent stream to produce a solvent rich stream comprising solvent and the residual draw compound, and a draw compound rich stream comprising the agglomerated draw compound and solvent;
    a second heat exchanger for cooling the solvent rich stream to produce a cooled single phase solvent rich stream; and
    a filtration module for separating the residual draw compound from the cooled single phase solvent rich stream to produce a residual draw compound stream and a purified solvent product stream.

3. The system according to claim 2, wherein the filtration module is selected from the group consisting of a nanofilter, an ultrafilter, and a reverse osmosis module.

4. The system according to claim 2, wherein a residual draw compound stream has a residual draw compound content of 0.1% or less after thermally induced phase separation.

5. The system according to claim 2, wherein a residual draw compound stream has a residual draw compound content of 0.5% or less after thermally induced phase separation.

6. The system according to claim 1, wherein the semipermeable membrane is a forward osmosis membrane and wherein the draw compound exhibits a reverse solute diffusion through the forward osmosis membrane of from about 0.02 GMH to about 0.035 GMH.

7. The system according to claim 1, wherein the draw compound has a cloud point temperature from 20° C. to 175° C.

8. The system according to claim 1, wherein the draw compound has a cloud point temperature from 35° C. to 125° C.

9. The system according to claim 1, wherein the draw compound has a cloud point temperature from 40° C. to 80° C.

10. A method for purifying or treating a feed solution, the method comprising:
providing a semipermeable membrane having a feed side and a draw side;
providing a feed solution comprising a solvent and having a first osmotic pressure;
providing a draw solution comprising a draw compound and having a second osmotic pressure, wherein the draw compound comprises a branched random, sequential, or block molecular chain consisting of at least one oxide monomer selected from the group consisting of styrene oxide, epifluorohydrin, epichlorohydrin, oxetane, dioxilane, trioxane, butyl glycidyl ether, phenyl glycidyl ether, and allyl glycidyl ether, wherein the molecular chain including at least one oxide monomer is temperature-sensitive and has a temperature-dependent affinity with a feed solvent,
and wherein the draw compound further comprises a first terminal group and a second terminal group, at least one of the first terminal group and the second terminal group selected from the group consisting of a hydroxyl group, an amine group, a carboxylic group, an alkyl group, and a C1 to C14 substituted and unsubstituted alky group;
causing the solvent to be transported from the feed side through the semipermeable membrane to produce a dilute draw solution on the draw side of the semipermeable membrane;
heating the diluted draw solution to initiate phase separation and produce a two phase effluent stream comprising a liquid phase of draw compound and a liquid phase of solvent;
causing the draw compound to agglomerate in the diluted draw solution to produce an agglomerated two-phase effluent stream comprising a liquid phase of agglomerated draw compound and a liquid phase of solvent;
separating the agglomerated draw compound from the diluted draw solution to produce a solvent rich stream, comprising residual draw compound and solvent, and a solute rich stream, comprising agglomerated draw compound and solvent;
cooling the solvent rich stream to produce a cooled single phase solvent rich stream comprising the residual draw compound; and
separating the residual draw compound from the cooled single phase solvent rich stream to produce a residual draw compound stream and a purified solvent product stream.

11. The method according to claim 10, wherein the draw compound has three or more branches, each branch comprising one or more epoxide monomers selected from the group consisting of ethylene oxide, propylene oxide, styrene oxide, epifluorohydrin, epichlorohydrin, oxetane, dioxilane, trioxane, butyl glycidyl ether, phenyl glycidyl ether, and allyl glycidyl ether.

* * * * *